United States Patent
Li et al.

(10) Patent No.: US 6,262,737 B1
(45) Date of Patent: Jul. 17, 2001

(54) 3D MESH COMPRESSION AND CODING

(75) Inventors: Jienkun Li, Los Angeles; Chung-Chieh Jay Kuo, Arcadia, both of CA (US)

(73) Assignee: University of Southern California, Los Angeles, CA (US)

(\*) Notice: Subject to any disclaimer, the term of this patent is extended or adjusted under 35 U.S.C. 154(b) by 0 days.

(21) Appl. No.: 09/127,053

(22) Filed: Jul. 31, 1998

Related U.S. Application Data

(60) Provisional application No. 60/073,087, filed on Jan. 30, 1998.

(51) Int. Cl.$^7$ .................................................. G06T 15/00
(52) U.S. Cl. .................................................. 345/419
(58) Field of Search ................... 345/419, 429, 345/420, 423, 427, 428

(56) References Cited

U.S. PATENT DOCUMENTS

| | | | |
|---|---|---|---|
| 5,929,860 | \* 7/1999 | Hoppe | 345/419 |
| 5,933,153 | \* 8/1999 | Deering et al. | 345/501 |
| 5,966,140 | \* 10/1999 | Popovic et al. | 345/441 |
| 6,009,435 | \* 2/1999 | Taubin et al. | 707/101 |

\* cited by examiner

*Primary Examiner*—Mark Zimmerman
*Assistant Examiner*—Huedung X. Cao
(74) *Attorney, Agent, or Firm*—Farjami & Farjami LLP

(57) ABSTRACT

Single and progressive-resolution coding algorithms for the compression of 3-D polyhedral meshes are disclosed. In the single-resolution mode, the mesh topology (or connectivity) is encoded by a constructive traversing approach applied to the dual graph of the original mesh while the mesh geometry is encoded by successive quantization and the bit-plane coding (achieved by context arithmetic coding). In the progressive-resolution mode, the mesh is represented by a coarse approximation (i.e., the base mesh) and a sequence of refinements. Both the base mesh and the refinement operations are entropy coded so that a series of mesh models of continuously varying resolutions can be constructed from the coded bit stream. Topological and geometrical data of a 3-D mesh are encoded separately according to their importance and then integrated into a single bit stream. In decoding, the decoder finds from the bit stream the most important information and gradually adds finer detailed information to provide a more complete 3-D graphic model. The decoder can stop at any point while giving a reasonable reconstruction of the original model. The disclosed algorithm was applied to complicated 3-D meshes and achieved a compression ratio of 20:1 while maintaining a good graphic quality.

38 Claims, 15 Drawing Sheets

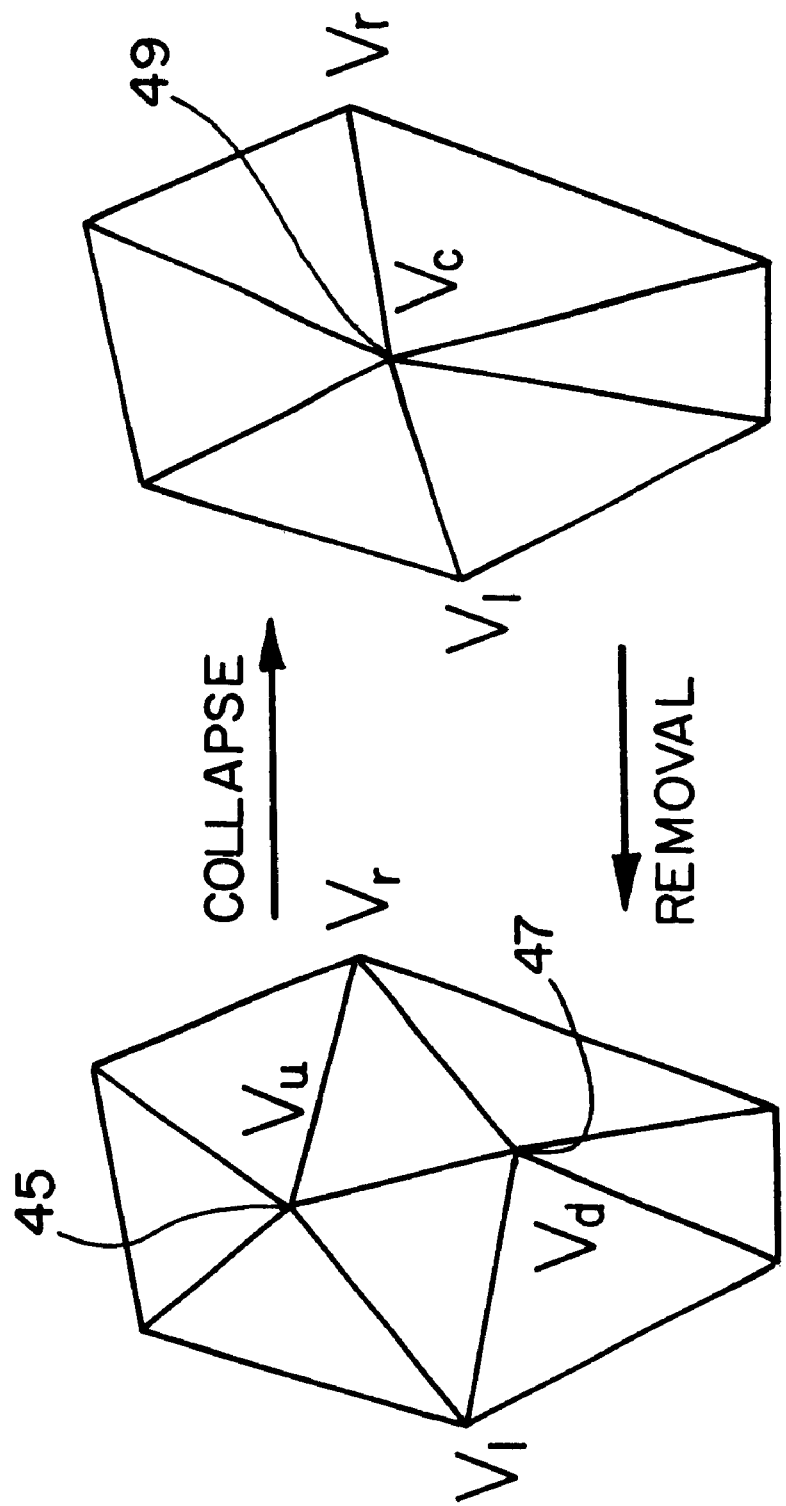

3D MESH COMPRESSION AND CODING

REFERENCE TO RELATED APPLICATION

This application is a continuation-in-part of provisional application Ser. No. 60/073,087, filed Jan. 30, 1998, for Method and Apparatus for 3D Mesh Compression and 3D Mesh Coding

BACKGROUND OF THE INVENTION

1. Field of the Invention

The present invention pertains generally to the field of computer graphics. More particularly, the present invention pertains to coding of information representing an image of a three dimensional model.

2. Description of Prior Art

Three dimensional ("3-D") graphic models have become increasingly popular since the advent of 3-D laser scanning systems and the boom of VRML (Virtual Reality Modeling Language) models. Laser scanning systems, for example, routinely produce geometric models with hundreds of thousands of vertices and triangles, each of which may contain additional information such as color and normal. Highly detailed models are also commonly adopted in computer graphics.

Three dimensional graphic models are often represented as complex polyhedral meshes composed of two types of data, i.e., topological and geometrical data. Topological data provide connectivity information among vertices (e.g., adjacency of vertices, edges and faces) while geometrical attributes describe the position, normal, color, and application dependent information for each individual vertex. In terms of implementation, most 3-D graphic file formats consist of a list of polygons each of which is specified by its vertex indices and a vertex attribute list. The terms vertex and node are used interchangeably herein.

Generally speaking, 3-D models are expensive to render, awkward to edit, and costly to transmit through a network. Wider application of 3-D graphics potentially could be limited due to these obstacles. To reduce storage requirements and transmission bandwidth it is desirable to compress these models with lossy compression methods which keep the distortion within a tolerable level while maximizing data reduction. Another important consideration is to apply graphic coding in a progressive fashion to allow easier control of data such as progressive display, level-of-detail control and multi-scale editing. This functionality demands that the mesh be approximated with different resolutions, which is vital for real-time applications. To achieve this goal, it is required for the mesh to be reduced to a coarse approximation (i.e. the base mesh) through a sequence of graphic simplifications.

Simplification and compression of 3-D mesh data has been studied by quite a few researchers. Most early work focused on the simplification of graphic models. In W. J. Schroeder, "Decimation of Triangle Meshes," Computer Graphics Proceedings, Annual Conference Series, pp. 65–70, ACM SIGGRAPH, July 1992, the author proposed a decimation algorithm that significantly reduced the number of polygons required to represent an object. Turk, in "Retiling Polygon Surfaces," Computer Graphics Proceedings, Annual Conference Series, pp. 55–64, ACM SIGGRAPH, July 1992, presented an automatic method of creating surface models at several levels of detail from an original polyhedral description of a given object. Hoppe et al., in "Mesh Optimization," Computer Graphics Proceedings, Annual Conference Series, pp. 19–26, ACM SIGGRAPH, August 1992, address the mesh optimization problem of approximating a given point set by using smaller number of vertices under certain topological constraints.

Recent work has emphasized the compression of graphic models. Deering, in "Geometry Compression," Computer Graphics Proceedings, Annual Conference Series, pp. 13–20, ACM SIGGRAPH, August 1995, discusses the concept of the generalized triangle mesh which compresses a triangle mesh structure. Eck et al. in "Multiresolution Analysis of Arbitrary Meshes," propose a wavelet transformation defined on an arbitrary domain to compress 3-D models of subdivision connectivity. Taubin, in "Geometric Compression Through Topological Surgery," Tech. Rep. RC-20340, IBM Watson Research Center, January 1996, presented a topological surgery algorithm which utilized two interleaving vertex and triangle trees to compress a model. More recently, Cohen et al., in "Simplification Envelopes," Computer Graphics Proceedings, Annual Conference Series, pp. 119–28, ACM SIGGRAPH, August 1996, introduced the concept of simplification envelopes so that a hierarchy of level-of detail approximations for a given polyhedral model could be generated automatically. Hoppe in "Progressive Meshes," Computer Graphics Proceedings, Annual Conference Series, pp. 99–108, ACM SIGGRAPH, August 1996, proposed a progressive mesh compression algorithm that is applicable to arbitrary meshes.

SUMMARY OF THE INVENTION

The present invention provides a new compression algorithm for 3-D meshes operating with both single and progressive resolution modes. The single resolution mode compresses the topological data through a constructive traversal and encodes geometrical data by local prediction. The progressive resolution mode represents the mesh by a base mesh and a sequence of refinement steps. Both the base mesh and the refinement sequence are entropy coded into a single bit stream in such a way that, along the encoding process, every output bit contributes to the reduction of coding distortion, and the contribution of bits decreases according to their order of position in the bit stream. At the receiver end the decoder can stop at any point while generating a reconstruction of the original model with the best rate distortion tradeoff. A series of models of continuously varying resolutions can thus be constructed from the single bit stream. This property, often referred to as the embedding property, since the coding of a coarser model is embedded in the coding of a finer model, can be widely used in robust error control, progressive transmission and display, and level-of-detail control.

BRIEF DESCRIPTION OF THE DRAWINGS

The other aspects, features, objects, and advantages of the present invention will be more fully understood and appreciated upon consideration of the following detailed description of a preferred embodiment of the invention, presented in conjunction with the accompanying drawings, wherein:

FIGS. 8(a) and 8(b) are a graphical representation illustrating vertex split and edge collapse according to the invention.

DETAILED DESCRIPTION OF PREFERRED EMBODIMENTS

Single-Resolution Mode

The single resolution mode includes the coding of topological and geometrical data. The topological data of a mesh are encoded losslessly. For geometric data, a local prediction and encoding of the residue is progressively performed to reach varying rate distortion performances.

Coding of Topological Data—Constructive Traversal

A constructive traversing scheme is described below where a mesh is constructed by connecting a sequence of traversal steps gradually. The traversing procedure begins with a single node and one link is traversed at a time. A queue $\Theta$ of nodes is maintained during the traversal. It records the order of each node to be visited.

The traversal is carried out based on $\Theta$ as follows:

1. Initialize queue $\Theta$ with a node with index n. Pick one of the links incident to n as its principle link. Both the node and the principle link can be selected arbitrarily.

2. For the leading node $n_s$ in $\Theta$ traverse each of its unvisited links in a counterclockwise order starting from its principle link.

3. For each link $l=(n_s; n_e)$ in Step 2, if $n_e$ was not included in $\Theta$ previously, add $n_e$ to $\Theta$ and set l as its principle link.

4. After Steps 2 and 3 are completed for node $n_s$, delete node $n_s$ from $\Theta$.

5. If $\Theta$ is not empty, go to Step 2. Otherwise terminate the traversal.

Figure 1:
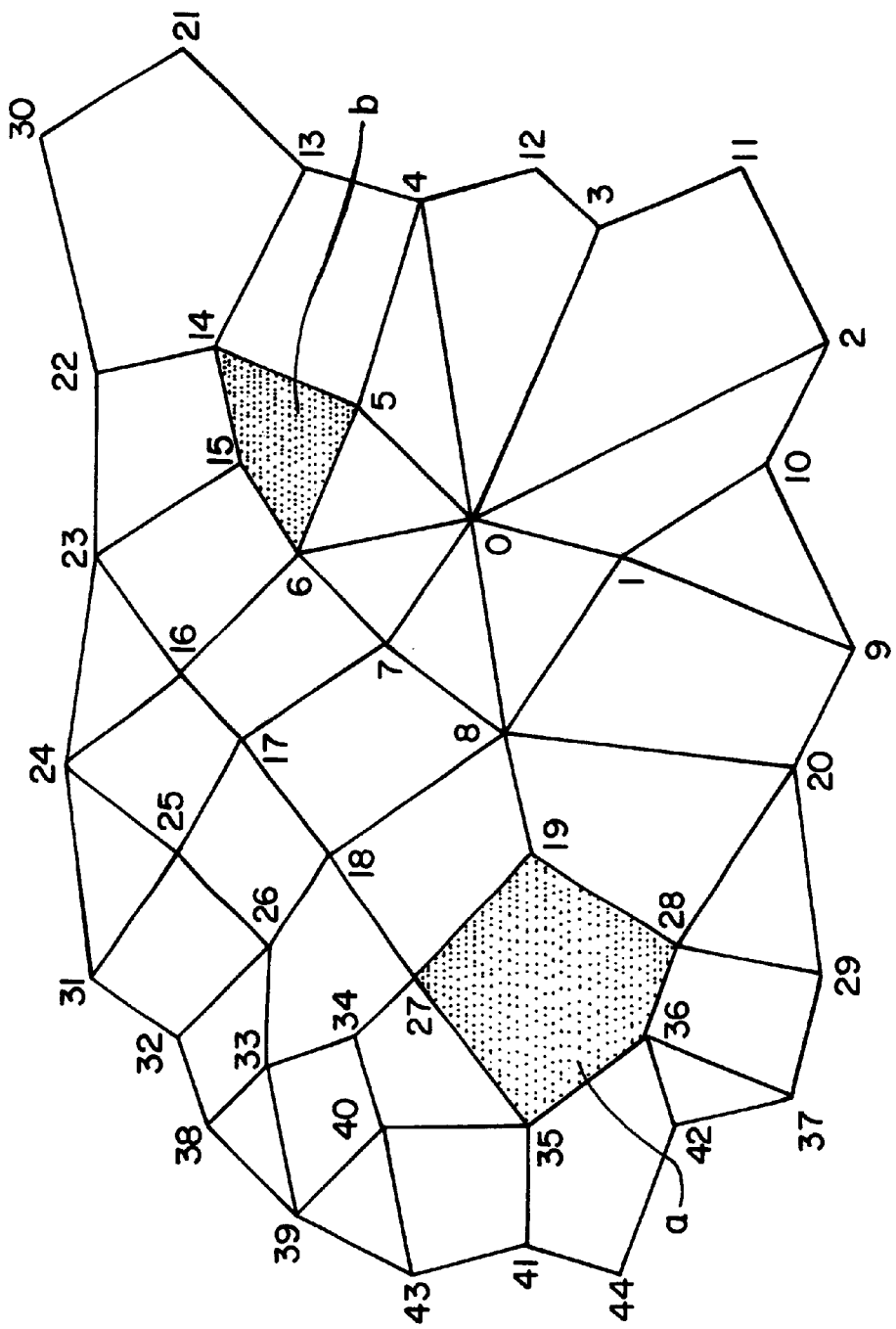
FIG. 1 is a graph illustrating the traversing order for each node for a given mesh in accordance with the invention.

A simple example is given in FIG. 1 to show the traversing order of each node for a given mesh. This mesh represents an open surface with two holes, (a) and (b).

Figure 2B:
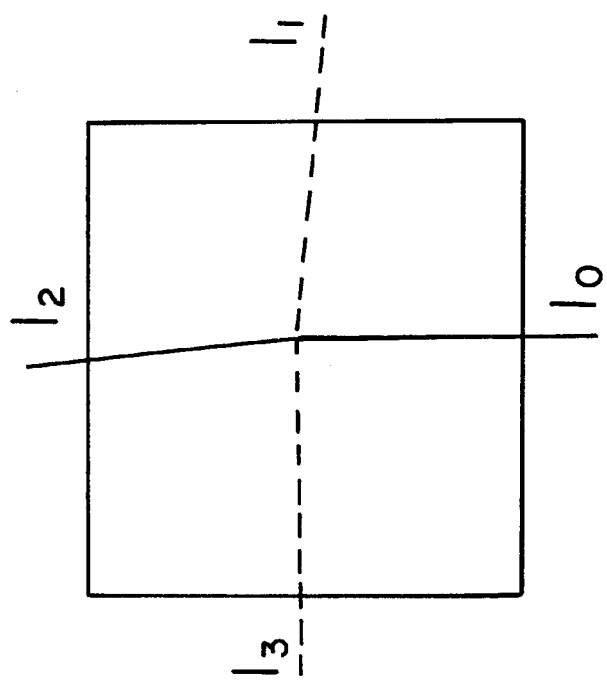
FIGS. 2(a) and 2(b) illustrates two link set configurations in accordance with the invention.
Figure 2A:
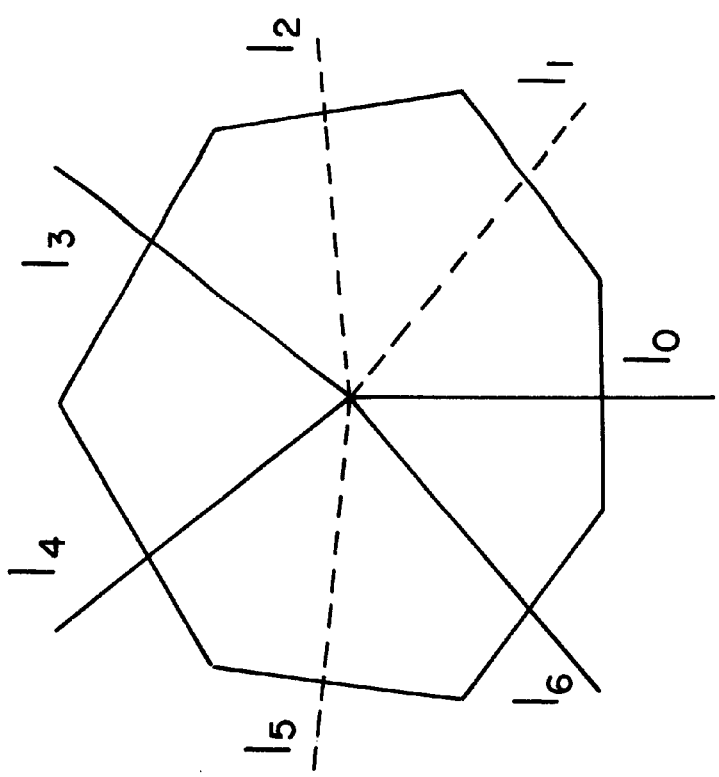

If every traversal step of a mesh is recorded, it can be reconstructed by repeating the entire traversing procedure starting from the initial node. Thus, during the traversal, a link set is bookkept for each node of the mesh to record relevant traversal results and assist the coding process. The configuration list cl(n) of node n stores all links incident to node n and orders them in a counterclockwise order. The total number of links in cl(n) is the same as the valance of node n. The configuration list is cyclic in the sense that the end of this list is implicitly connected to its beginning. The first element of the configuration list is the principle link. It serves as a starting point for tracing. The link list s(n) of node n consists of a sequence of binary numbers which denote whether a link is visited (labeled with 1) or not (labeled with 0). Two link configurations with respect to the central node are shown in FIG. 2, where visited links are depicted in solid lines and unvisited links in dashed lines. We have $cl(n)=(l_0, l_1, l_2, l, l_4, l_5, l_6)$ and $s(n)=(1, 0, 0, 1, 1, 0, 1)$ for FIG. 2(a), and $cl(n)=(l_0, l_1, l_2, l_3)$ and $s(n)=(1, 0, 1, 0)$ for FIG. 2(b). The link set s(n) is modified whenever node n is involved in a traversal step.

Coding Process

For leading node $n_s$, visited in Step 2 of the constructive traversing algorithm, the modification of $s(n_s)$ is straightforward. Since new links are visited in counterclockwise order, each of them is changed from 0 to 1 in the next tracing step sequentially. No extra coding bits are required.

For each link $l=(n_s, n_e)$ visited in Step 3 of the constructive traversing algorithm, it can be a branch or a merger depending on the type of $n_e$. It is called a branch if $n_e$ has not yet been included in Q previously. Otherwise it is a merger. A binary symbol bm(l) is used to record the type of the link. For a branch $l=(n_s, n_e)$, node $n_e$ is added to Q as described earlier. Furthermore, the valance $v(n_e)$ is recorded and the link list $s(n_e)$ initialized as $(1, 0, \ldots 1)$. For a merger $e=(n_s, n_e)$, two additional pieces of information have to be collected so that the traversal can be repeated to reconstruct the original without ambiguity. They are the index id of node $n_e$, and the position of e in $s(n_e)$ There are two ways to record the id of $n_e$, i.e., a global indexing scheme, which is robust but costly, and a local (or relative) indexing scheme, which is efficient but may fail sometimes. To save coding bits, it is preferable to perform the local indexing scheme as much as possible. The global indexing scheme is performed only when the local indexing scheme fails. Let $\varepsilon$ be the set of links that have been traversed already. The local indexing scheme attempts to locate $n_e$ by tracing links contained by $\varepsilon$ in a clockwise or counterclockwise fashion. The clockwise tracing procedure is detailed below, where s(n)[i]issued denote the $i^{th}$ element of s(n):

1. Initialization: let $n_c$ be $n_s$, $l_c=(n_c, n_e)$ and set counter step to 0. Let $l_c$ be the ith element of cl(nc).

2. Find the first j>i (in the cyclic sense) such that $s(n_c)[j]=1$ and express $cl(n_c)[j]$ as $(n_c, n_u)$.

3. Increase step by 1, if i and j are not consecutive.

4. Check whether $n_u=n_e$. If so, report step and terminate the tracing. Otherwise update node $n_c$ to node $n_u$.

Figure 3:
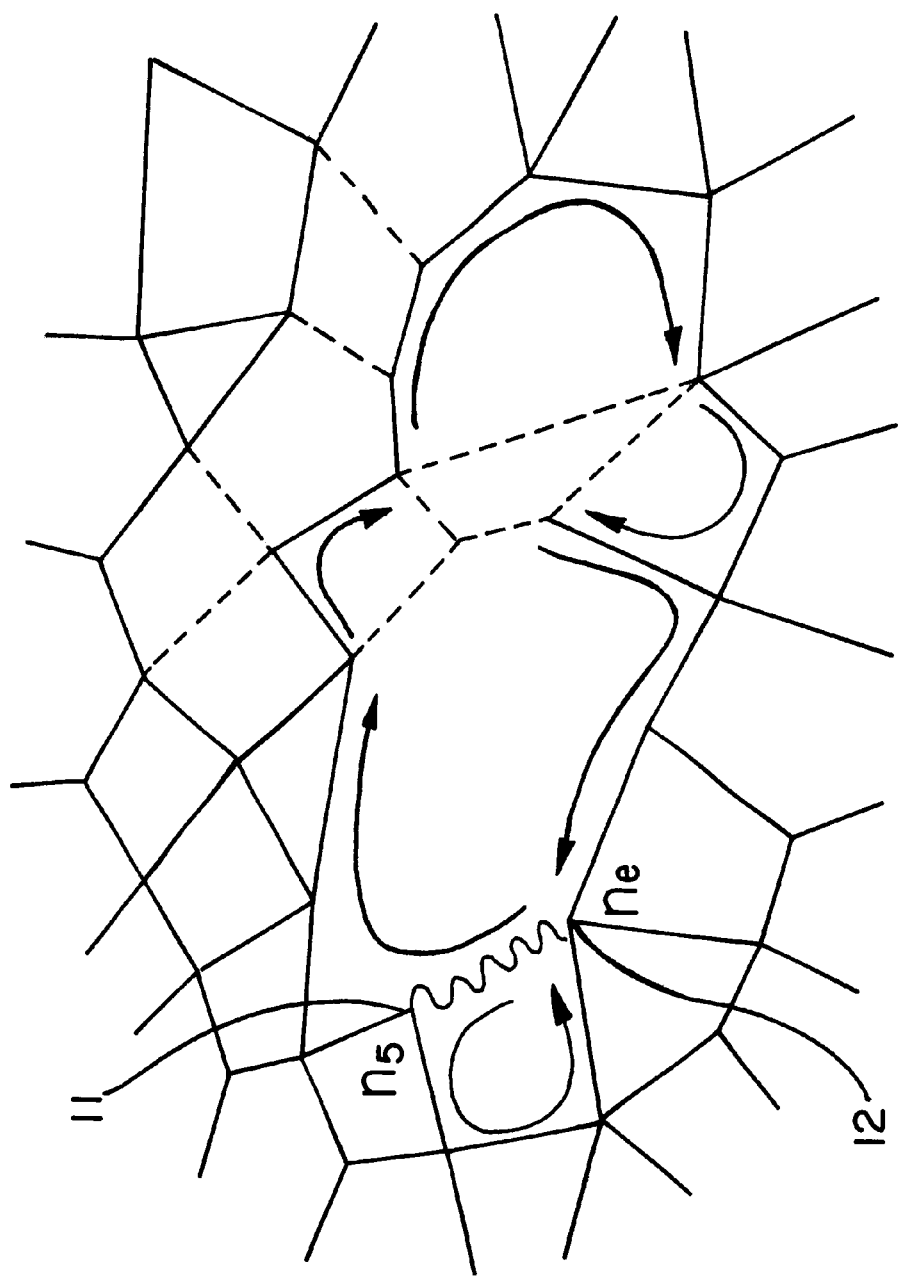
FIG. 3 is a graph that illustrates the tracing of a merge link according to the invention.

This algorithm can be best explained with an example as shown in FIG. 3, where visited links are depicted in solid lines while unvisited links are depicted in dashed lines. The merger is shown in terms of the curved line. Starting from node $n_s$, 11 the clockwise search takes five steps to locate the desired node $n_e$ 12 based on links traversed before. The five steps are illustrated with five arrow symbols. Note that each step ends at either a node with a certain unfilled link or the target node $n_e$. The counterclockwise tracing is basically the same as the clockwise tracing except that we change j>i to j<i (in the cyclic sense). For the same example, the backward tracing takes only one step to reach the target node. The tracing pattern which gives a smaller number of steps is chosen for coding. There are situations where the above tracing algorithm may fail. For example, the local tracing can be trapped in an infinite loop. Then the global indexing scheme has to be applied. It is based on the observation that the target node $n_e$ has to be in queue $\Theta$ since ($n_s$, $n_e$) is a merger. By viewing $\Theta$ as a cyclic list, the global method starts from node $n_s$, to search $n_e$ in $\Theta$ top-down or bottom-up. The search is conducted one node at one step until it finds node $n_e$. Again, the search direction which gives a smaller number of steps is used and this step number is reported. To summarize, to specify the id of the target node $n_e$, we need a binary symbol for the search method (global or local), a binary number for the search direction, and an integer number for the number of search steps.

Figure 4:
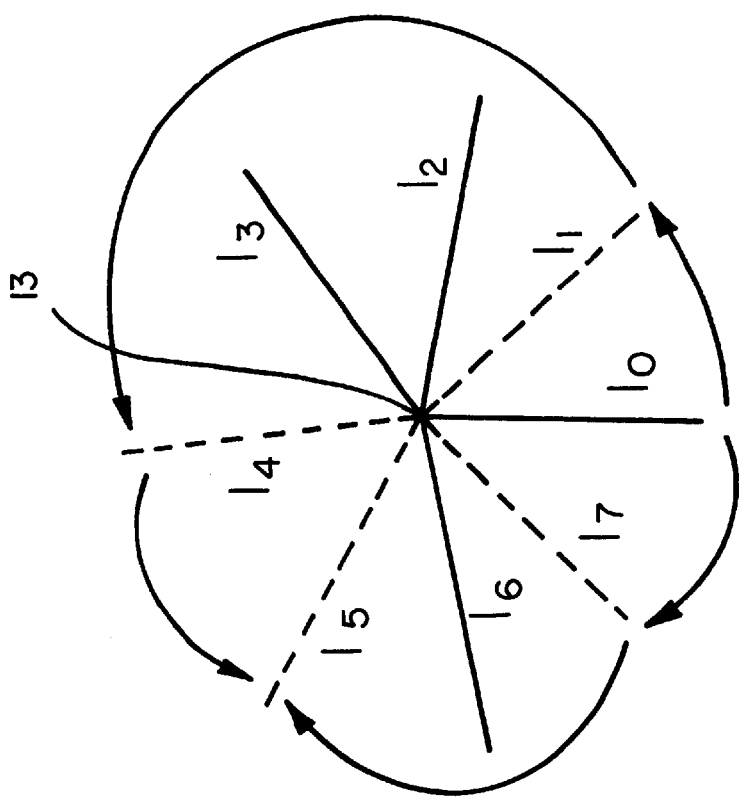
FIG. 4 is a graph illustrating the coding of a merge link according to the invention.

As far as the position of merger l in s($n_e$) is concerned, it can be represented by an integer number counted from the principle link in a forward or backward direction by considering visited links only. The actual counting direction is chosen to be consistent with the search direction for $n_e$. In FIG. 4, an example is illustrated where node $n_e$ 13 has seven links with the principle link $l_0$. Before the merge occurs, the link list s($n_e$) is (1, 0, 1, 1, 0, 0, 1, 1). There are only five visited links. Now, with link $l_5$ as the merger, its position is recorded as three when counted in a forward direction and two when counted in a backward direction.

Application to Dual Graph

Figure 5:
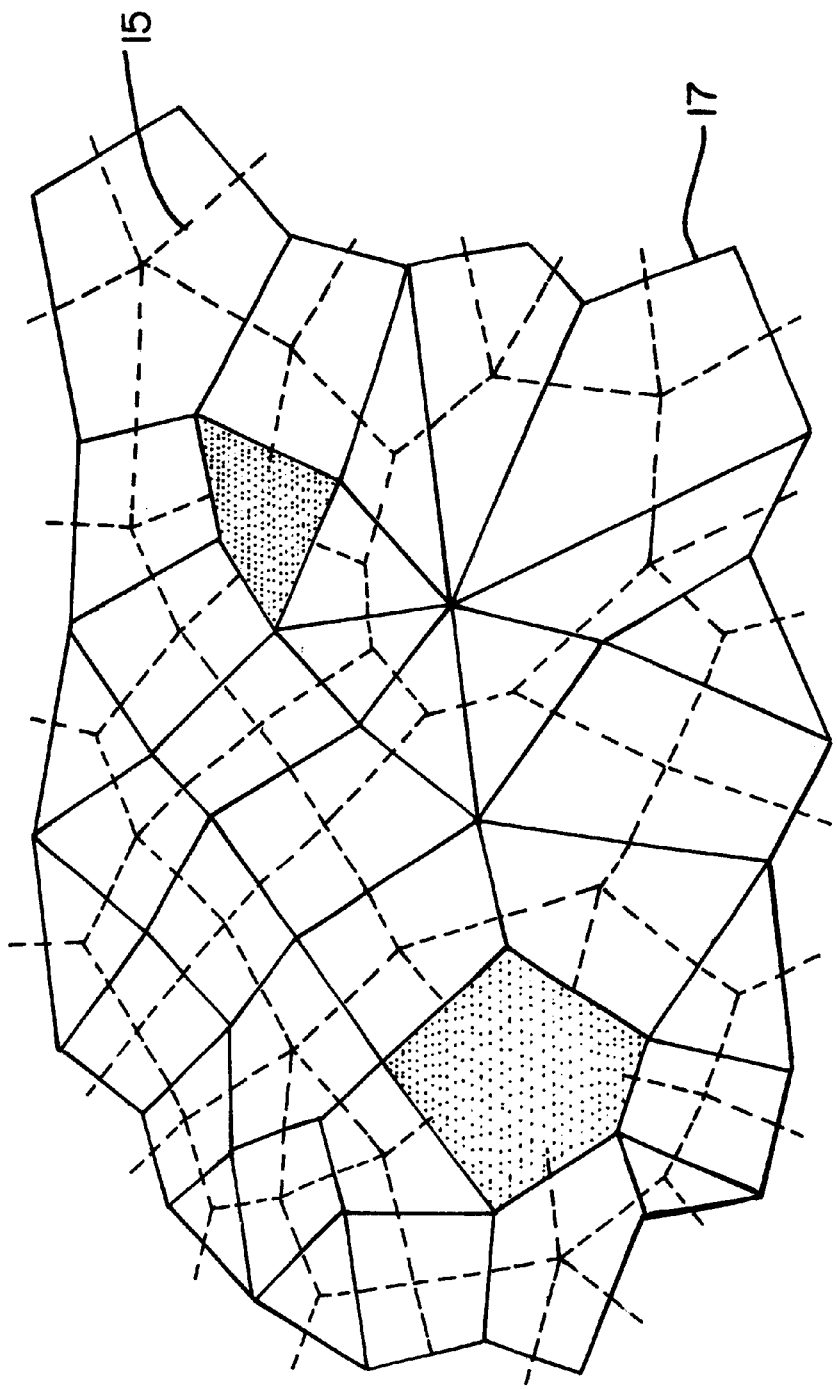
FIG. 5 illustrates a polyhedral mesh and its dual graph according to one aspect of the invention.

The dual graph $G^*$ 17 of a polyhedral mesh G 15 is constructed by converting a polygon in G into a node and two nodes in the dual graph $G^*$ are linked if the corresponding polygons in the original graph G share the same edge. It turns out that the dual graph $G^*$ is another polyhedral mesh. An example of a polyhedral mesh and its dual graph is shown in FIG. 5. There is a one-to-one correspondence between the original mesh G, 15 (dashed lines) and its dual graph $G^*$, 17 (solid lines). Either one can be used to represent the topological structure of a 3-D graphic model uniquely. Since the above algorithm handles a general polyhedral mesh it can be applied to the original mesh as well as its dual graph. In the traversal of G the vertex valence is distributed over a wider dynamic range which is typically from 3 to 8. However, most meshes primarily consist of triangles and quadrangles so that the vertex valence is highly concentrated on 3 and 4. This property can be effectively exploited by the entropy coder to make the proposed algorithm even more efficient.

Coding of Geometry

Geometry data specify attributes for vertices (or nodes) of a 3-D polyhedral mesh such as positions, normal, colors and texture coordinates. They are functionally similar to pixel values of digital image/video and sample values of digital audio. The major difference between digital audiovisual and 3-D graphic media formats is that the former is usually defined on a regular spatial-temporal grid so that a transform can be applied for energy compaction and redundancy removal while a 3-D graphic model is defined on an irregular spatial grid. Consequently its geometry data take the form of a list of sampled points on an arbitrary surface with no particular order. Although geometry data bears a strong local correlation it is difficult to find a simple transform to exploit such a correlation.

The approach adopted currently for geometry compression is to use local prediction to remove data redundancy and then apply a quantization scheme and a run-length coding method to encode the prediction error. In an article by H. Hoppe entitled "Progressive Meshes," Computer Graphics Proceedings, Annual Conference Series, pp. 99–108, ACM SIGGRAPH, August 1998, the disclosure of which is hereby incorporated by reference, the author arranged vertices via a sequence of vertex splits, and applied the delta prediction followed by the Huffman coding. In Taubin et al., "Geometric Compression Through Topological Surgery," Tech. Rep. RC-20340, IBM Watson Research Center, January 1996, the authors defined a vertex tree structure so that the position of a vertex is predicted by those of several ancestor vertices along the tree. The prediction residue is then truncated and encoded with a Huffman code. Choi et. al., in Results of Core Experiment M2/M3: Geometry Coding Using PRVQ," Contribution Document M3148, MPEG4 San Jose Meeting, February 1998, used the same vertex tree and the prediction scheme but developed a multi-stage vector quantization (VQ) method to encode the prediction residue. The disclosure of the aforementioned articles is hereby incorporated by reference in its entirety.

Typically, there are three steps in a geometry coding scheme: vertex ordering, data prediction and entropy coding. The first step arranges the list of vertices into a certain structure so that the local relationship among vertices can be described and exploited more conveniently. The second step utilizes such a structure to remove the redundancy of geometrical data via prediction and produces a sequence of prediction residues as a result. The final step quantizes and codes the residue according to a rate-distortion performance requirement. For simplicity, the focus herein is on the compression of vertex positions. It is clear, however, that the same technique is applicable to other types of geometry data such as surface normals and colors.

The prediction of vertex positions is a causal process, i.e., a vertex has to be predicted by its preceding vertices. Any prediction scheme should obey this rule so the decoder can decode the data properly. The definition of preceding vertices can, however, vary due to different proposed schemes. In our proposed scheme, a vertex is predicted by some of its neighboring vertices. For a given vertex v, its neighboring vertices are defined as those of polygons incident to v. However, not all of the neighboring vertices can be used for prediction but only the preceding ones are eligible. The preceding vertices of vertex v referred to herein are those added to queue $\Theta$ before v.

Vertex Prediction

There are two approaches to predict the position of a vertex v. The first one regards v as one of the vertices of a polygon and attempts to predict the position of v based on those of preceding vertices of the same polygon. The second one regards vertex v as the center of several vertices and predicts its position by the average of their positions. The first approach is preferably used at first. If the first approach is not applicable then the second approach is used. Since the second approach is straightforward the following discussion provides more details on the first approach.

By the first approach, a polygon is attempted to be rebuilt based on a part of its vertices. It requires at least three vertices of a 3-D polygon to predict its remaining vertices. For a plane determined by three points $p_1$, $p_2$ and $p_3$ in the 3-D Euclidean space, any point p in the plane can be represented by $$p=\lambda_1 p_1+\lambda_2 p_2+\lambda_3 p_3$$

where $\lambda_1+\lambda_2+\lambda_3=1$. For a regular n-vertex polygon ($p_1 p_2 \ldots p_n$), if three vertices $p_i$, $p_j$ and $p_k$ are known, then any other vertex $p_l$ can be recovered precisely by the above formula where $\lambda_1$, $\lambda_3$, depends only on i, j, k, l and n. To represent their dependent relationships of $\lambda_1$, $\lambda_2$ and $\lambda_3$, are denoted by $\alpha(n, i, j, k, l)$, $\beta(n, i, j, k, l)$ and $\gamma(n, i, j k, l)$, respectively.

The computation of $\alpha$, $\beta$, and $\gamma$ can be done as follows. First, without loss of generality, it is supposed that the regular n-polygon is on the unit circle of the xy-plane such that $P_i = (\cos(i_\theta), \sin(i_\theta))$;

$P_j = (\cos(j_\theta), \sin(j_\theta))$;

$P_k = (\cos(k_\theta), \sin(k_\theta))$;

$P_l = (\cos(l_\theta), \sin(l_\theta))$;

where $_\theta = 2_\pi/n$. Then, we have $\{\alpha\cos(i\theta) = \beta\cos(j\theta) + \gamma\cos(k\theta) = \cos(l\theta)$, $\{\alpha\sin(i\theta) = \beta\sin(j\theta) + \gamma\sin(k\theta) = \sin(l\theta)$, $\{\alpha + \beta + \gamma = 1$.

The solution to the above system is:

$$\begin{cases} \alpha = \frac{\sin((l-j)\theta) + \sin((j-k)\theta) + \sin((k-l)\theta)}{\sin((i-j)\theta) + \sin((j-k)\theta) + \sin((k-i)\theta)} \\ \beta = \frac{\sin((i-l)\theta) + \sin((l-k)\theta) + \sin((k-i)\theta)}{\sin((i-j)\theta) + \sin((j-k)\theta) + \sin((k-i)\theta)} \\ \gamma = \frac{\sin((i-j)\theta) + \sin((j-l)\theta) + \sin((l-i)\theta)}{\sin((i-j)\theta) + \sin((j-k)\theta) + \sin((k-i)\theta)} \end{cases}$$

Figure 6C:
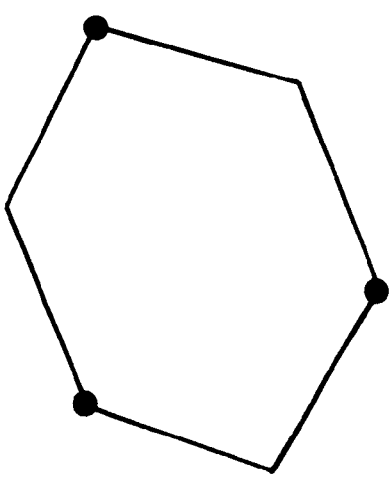
FIGS. 6(a), 6(b) and 6(c) are a graphical representation illustrating recovery of a polygon according to the invention.
Figure 6B:
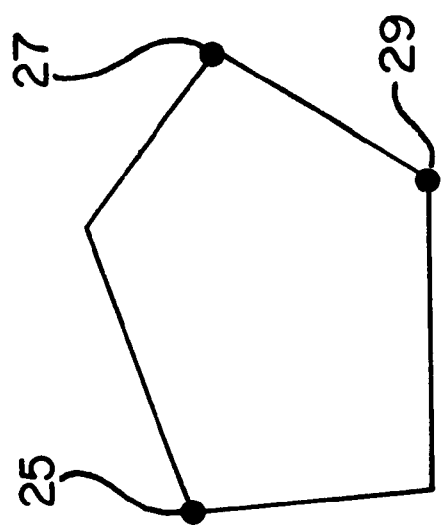
Figure 6A:
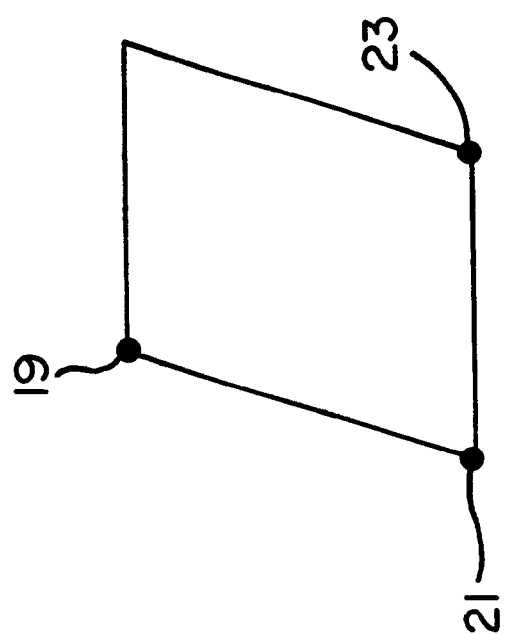

For an arbitrary n-vertex polygon $(p_1 p_2 \ldots p_n)$ in the 3-D Euclidean space, the following approximation is adopted:

$P_l = \alpha(n, i, j, k, l)p_i + \beta(n, i, j, k, l)p_j + \gamma(n, i, j, k, l)p_k$ In other words, $p_l$ is approximated by a linear combination of $p_i$, $p_j$ and $p_k$, where coefficients are set to those used to recover the regular n-vertex polygon of a specific type. The recovered polygon can be mapped to any regular polygon by an affine transformation. FIG. 6 shows recoveries of a quadrangle, FIG. 6(a), pentagon, FIG. 6(b), and hexagon, FIG. 6(c), where the three preceding vertices 19, 21 and 23 are depicted with black dots. These three vertices 19, 21 and 23 are not required to be consecutive. If a polygon has more than three preceding vertices then any three of them 25, 27 and 29 can be used to recover the polygon. To allow each preceding vertex to contribute equally, every possible combination of three preceding vertices is used to approximate the polygon. For a polygon with k preceding vertices, there are total of (k/3) different combinations. Each combination gives one prediction, and the polygon is finally recovered by the average of all predictions.

Figure 7B:
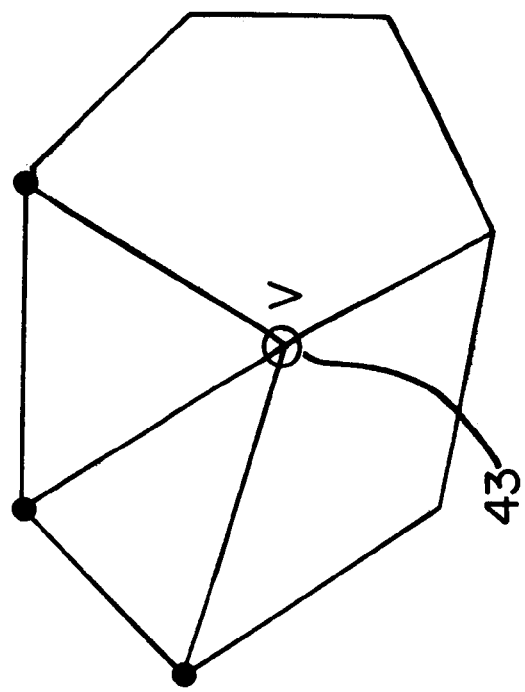
FIGS. 7(a) and 7(b) are a graphical representation illustrating vertex prediction according to the invention.
Figure 7A:
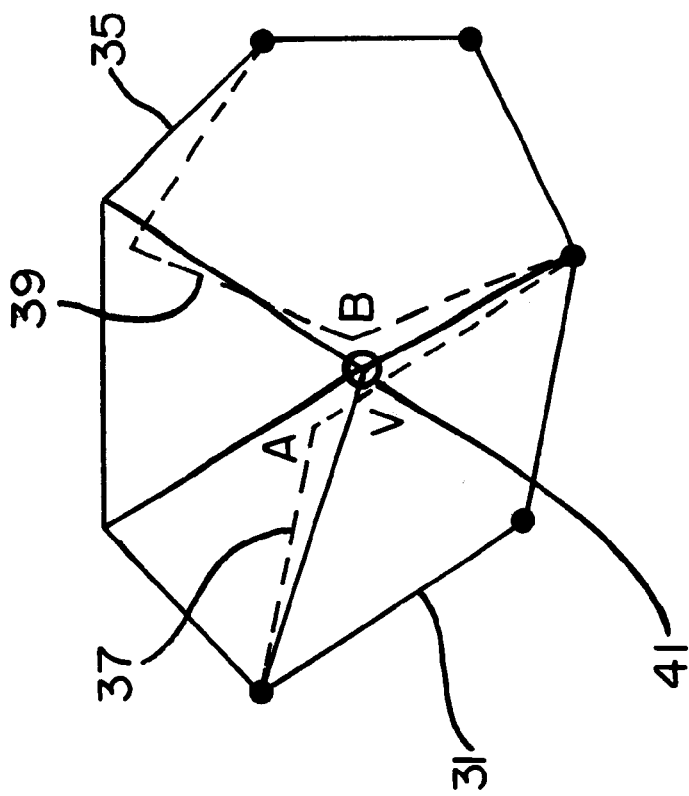

Since there are multiple polygons incident to a vertex, the position of this vertex can be predicted based on more than one individual polygon. In such a case, the final prediction is taken as the average of predictions produced by every applicable polygon. FIG. 7 shows the prediction of vertex v under two different circumstances, where its preceding vertices are depicted with block spots. FIG. 7(a), both the quadrangle 31 and the pentagon 35 can be recovered with predictions A, 37 and B, 39, respectively, and the average of A and B is taken as the prediction for v, 41. The above approach requires that each polygon contain at least three preceding vertices. This condition may not be met in some cases, such as FIG. 7(b). In such a case, the position of the vertex 43 is predicted by the average of all the preceding vertices.

For a model with only one connected component, the first vertex of queue Q has no ancestor. Its position can be coded either separately as overhead, or treated as the residue resulting from a null prediction. For a model with multiple connected components, the first vertex of the first component has no ancestor either. It is handled in the same way as in the single-component model. However, the first vertex of any other component can be predicted by the position of the last vertex of the previous component. Since the coder can freely choose the coding order of components as well as the first vertex of each component, an optimal coding configuration to minimize prediction residues can be found.

Successive Quantization and Bit-Plane Coding

Most conventional graphic coding methods are devoted to the single resolution mode. That is, input coefficients are mapped onto a finite index set by a single quantization step. The index for each coefficient is then converted to intermediate symbols and encoded by an entropy coder. An embedded coding scheme as described herein may be used instead of the single resolution mode by adopting a different quantization procedure called successive quantization. Successive quantization uses a sequence of gradually refined quantization steps instead of a single quantization step. The quantization step size is refined so that coefficients are approximated by an increasing precision. For each quantization step, a binary output is produced for each coefficient to record the quantization result. All symbols generated via the same quantization step are then grouped together and entropy coded before the quantization of the next step. This is often known as bit-plane coding. Bit-plane coding can be effectively achieved by using the context arithmetic coder. For details of successive quantization, bit-plane coding and context arithmetic coding the reader is referred to Li et al., "Progressive Coding of 3D Graphic Models," Proceedings of IEEE, Vol. 86, pp. 1052–63, June 1998, the disclosure of which is hereby incorporated by reference in its entirety. It is worthwhile to point out that even though the method presented above is called the single resolution method it still generates an embedded (or progressive) bit stream due to the embedded coding scheme applied to geometrical data. The term of "a single resolution" is adopted here to indicate that the topological structure (or connectivity) of a 3-D mesh remains the same throughout the coding process.

Coding of Overhead

To efficiently compress small as well as large-size models, the overhead bits preferable should be reduced to a minimum. First of all the initial quantization threshold $T_0$ must be kept as the overhead. It is usually stored as a 32-bit floating point number, and can be reduced to as low as a 16-bit floating point number to meet the low bit rate requirement for the coding of models of small size. The position of the first vertex of the first component may be kept as the overhead also. It requires 3·32=96 bits. In an example of low bit rate coding (10 bit/vertex) of a model of 20 vertices the total number of overhead bits is between 112 and 128 which is in fact more than one half of the entire bit budget (e.g., 200 bits).

To improve the situation, the position of the first vertex may be coded as a residue. In other words, it is successively quantized and encoded (in contrast with the coding of its whole value at once). There are two consequences of this choice. First, the position value is usually much larger than prediction residues. By treating the position of the first vertex as a residue, the magnitude of the initial threshold $T_0$ has to be increased significantly and the first several quantization steps are solely used to encode the residue of the first vertex. For small size models, this choice is still more efficient than storing the position as a floating-point number directly in the overhead. For large size models this choice is less efficient and costs more bits. However, such a cost is negligible compared to the relatively large bit budget for large size models. Second, the first vertex serves as an anchor point for the entire mesh. The mesh could jump around as the position of the first vertex is refined gradually in the successive decoding stage. However, it does not introduce any visual distortion since the shape of the mesh is not deformed.

Progressive-Resolution Mode

Although the single-resolution compression method described above achieves a significant coding gain for topological and geometrical data reduction it may not be adequate in some cases. A simple analysis of the compression performance is given below. For a closed triangular mesh with n vertices and approximately 2n triangles, each vertex requires 32×3=96 bits to store the x, y and z coordinates as a floating-point number and each triangle requires 32×3=96 bits to store the three vertex indices as an integer number. If the mesh is represented in the binary format the number of bits required may be represented by the following relation:

$$n \times 96 + 2n \times 96 = 288n \text{ bits}.$$

The total number of bits can be 3~5 times larger, if the mesh is represented in ASCII format. When compressed, topological (or connectivity) data requires approximately 2 bits per triangle while the position of a vertex takes about 20 bits to generate a visually indistinguishable approximation. The total bit consumption is:

$$n \times 20 + 2n \times 2 = 24n \text{ bits}$$

Thus, the compression ratio is around 12:1. For a large model with tens of thousands of vertices, such a compression ratio is still not high enough to meet some storage and transmission requirements. Furthermore, the single-resolution method attempts to reduce the number of bits for model representation, but makes no effort to simplify the graphic model so that its rendering and editing speed can be enhanced. Real-time interactivity cannot be easily achieved for complicated single-resolution models even with today's high performance computers. For many applications, real-time rendering is frequently more important than the compression issue. To overcome these two problems the progressive-resolution representation of a 3-D mesh provides a good solution.

As described herein, the progressive-resolution mode is a 3-D mesh that is gradually transformed into a sequence of simpler meshes through graphic simplification steps. The final and simplest mesh is often referred to as the base mesh. To allow the conversion from one resolution to another, every simplification step has to be inevitable. This inverting process is called refinement. Thus, the original mesh can be reconstructed by the base mesh and a sequence of refinements arranged in the reverse order of the simplifications. Any intermediate result in the process can be used as an approximation of the original mesh. The more refinement steps utilized, the closer the approximation is to the original mesh. This multi-resolution property is related to topological data coding. However, the multi-resolution technique can also be applied to geometrical data coding as presented in the section on Successive Quantization and Bit-Plane Coding. These two progressively coded bit streams may be integrated into a single embedded bit stream for 3-D mesh representation as discussed below.

Graphic Simplification

The polygon is the primitive of an object represented by a polyhedral mesh. The cost of storing or transmitting a polyhedral mesh of n primitives is O(n). The cost of rendering such a model is also O(n) as discussed in Bar-Yehuda et al., "Time/Space Tradeoffs for Polygon Mesh Rendering," ACM Transactions on Graphics, Vol. 15, pp. 141–52, April 1996, and in Heckbert et al., "Multiresolution Modeling for Fast Rendering," Proceedings of Graphics Interface '94, pp. 43–50, Canadian Information Processing Society, May 1994. The disclosure of each of these two articles is hereby incorporated by reference in its entirety.

The primary goal of graphic simplification is to reduce the number of primitives required to faithfully represent an object. Several different algorithms have been proposed to serve this purpose. They can be roughly classified into three categories i.e., surface retiling, vertex decimation, and vertex clustering, as described below.

With surface retiling, polygonal surfaces are triangulated with a new set of vertices to replace the original set. The new set usually consists of fewer vertices than the original one while preserving its topology. In Turk, "Re-tiling Polygon Surfaces," Computer Graphics Proceedings, Annual Conference Series, pp. 55–64, ACM SIGGRAPH, July 1992, it is suggested to randomly add points on the polygonal surface and then re-distribute those points by exerting a repelling force while removing old vertices gradually. Hoppe et al., in an article entitled, "Mesh Optimization," appearing in Computer Graphics Proceedings, Annual Conference Series, pp. 19–26, ACM SIGGRAPH, August 1993, defined an energy function which is minimized to determine positions of new vertices. In Hinker et al., "Geometric Optimization," Proc. Visualization, pp. 189–95, October 1993, coplanar and near coplanar polygons are merged into larger complex polygons and then re-triangulated into fewer simple polygons. Kalvin and Taylor in "Superfaces: Polygonal Mesh Simplification with Bounded Error," IEEE Computer Graphics and Application, Vol. 16, pp. 64–77, May 1996, developed a similar algorithm which allows additional control of the approximation error. In Cohen et al., "Simplification Envelopes," Computer Graphics Proceedings, Annual Conference Series, pp. 119–28, ACM SIGGRAPH, August 1996, and in Varshney et al., "Generating Levels of Detail for Large-Scale Polygonal Models," Tech. Rep., Department of Computer Science, Duke University, 1995, the original polygonal surface is surrounded with two envelopes and then generated a simplified surface within the volume enclosed by these two envelopes. The disclosure of each of the aforementioned articles is hereby incorporated by reference.

By using vertex decimation, Schroeder, in "Decimation of Triangle Meshes," Computer Graphics Proceedings, Annual Conference Series, pp. 65–70, ACM SIGGRAPH, July 1992, proposed to make multiple passes over an existing polygonal mesh and use local geometry and topology information to remove vertices which meet a distance or an angle criterion. The hole left by the vertex removal is patched by a local triangulating process. Soucy et al., in "Multiresolution Surface Modeling Based on Hierarchical Triangulation," Computer Vision and Image Understanding, Vol. 63., pp. 1–14, January 1996, describe a more sophisticated algorithm following the same framework. The disclosure of each of the aforementioned articles is hereby incorporated by reference.

The idea behind vertex clustering is that a detailed part of a model is represented by a set of spatially close vertices. A clustering algorithm is used to generate a hierarchy of clusters and approximations with different resolutions. For a discussion of this concept see Schaufler et al., "Generating Multiple Levels of Detail from Polygonal Geometry Models," Virtual Environments, Eurographics Workshop, pp. 33–41, January 1995. Rossignac et al., in "Modeling in Computer Graphics: Methods and Applications," pp. 455–65, Springer-Verlag, 1993, divided the bounding box of the original model into a grid. Within each cell, vertices are clustered together into a single vertex, and the model surface is updated accordingly. He et al., in "Voxel Based Object Simplification," Proc. Visualization, pp. 296–303, 1995, adopted a signal-processing approach to sample the input object and used low-pass filtering to remove high frequencies of the object. Vertex split/edge collapse is the most commonly used clustering technique. It removes an edge and contracts two end points into a new vertex. To determine the position of the new vertex, Gueziec, in an article entitled, "Surface Simplification Inside a Tolerance Volume," Tech. Rep. RC-20440, IBM Watson Research Center, 1996, required the volume to be preserved after contraction. Hoppe in "Progressive Meshes," Computer Graphics Proceedings, Annual Conference Series, pp. 99–108, ACM SIGGRAPH, August 1996, and in "Progressive Simplicial Complexes," Computer Graphics Proceedings, Annual Conference Series, pp. 217–25, ACM SIGGRAPH, August 1997, used edge collapse to form the progressive representation of triangulated geometric models. Garland et al., in "Surface Simplification Using Quadric Error Metrics," Computer Graphics Proceedings, Annual Conference Series, pp. 209–17, ACM SIGGRAPH, August 1997, developed a method called pair contraction which is capable of contracting an arbitrary pair of vertices. The disclosure of each of the aforementioned articles is hereby incorporated by reference.

Although other techniques may be used, the vertex split/edge collapse technique is preferably used for graphic simplification due to the following reasons. First, vertex split naturally leads to a progressive representation of a model without any constraint. Second, an instance of vertex split requires the least number of bits to encode among existing techniques. It can be coded very efficiently since the vertex split operation only involves two incident edges. Third, vertex split provides the finest granularity for simplification or refinement. Each operation only renders a small change of the model, and such a change can be realized continuously by a morphing process. This enables a smooth transition between different resolutions of a model.

Vertex Split and Edge Collapse

An edge collapse operation $ecol(\{v_l, v_u, v_r, v_d\})$ removes edge $(v_u, v_d)$ from the mesh and merges the two end points $v_u$, 45 and $V_d$, 47 into a new vertex $v_c$, 49 as shown in FIG. 8. Edges previously incident to either $v_u$ or $v_d$ are then connected to vertex $v_c$. Two adjacent triangles $(v_l v_d v_u)$ and $(v_r v_u v_d)$, FIG. 8(a) vanish in this process. Each edge collapse decreases the number of vertices by one and the number of triangles by two. As a reverse process, a vertex split operation vsplit $(\{v_l, v_c, v_r\})$ divides a vertex $v_c$, 49 into two vertices $v_u$, 45 and $v_d$, 47. Consequently, edge $(v_u, v_d)$ and two adjacent triangles $(v_l, v_d v_u)$ and $(v_r v_u v_d)$ are created. Each vertex split increases the number of vertices by one and the number of triangles by two.

The edge collapse operation can be repeatedly applied to an original mesh denoted by $M_{org}$ where one edge is removed at a time. The process continues until a simple base mesh $M_{base}$ is obtained. This process can be expressed as:

$$M_{org} = M_n \xrightarrow{ecol_n} M_n - 1 \ldots \xrightarrow{ecol_2} M_1 \xrightarrow{ecol_1} M_0 = M_{base}$$

The sequence of edge collapse operations should be chosen carefully so that each $M_i$ approximates the original one with the best achievable quality. This problem will be addressed below. Each edge collapse operation can be inverted by a corresponding vertex split operation. Therefore the original mesh $M_{org}$ can be reconstructed based on the base mesh $M_{base}$ and a sequence of vertex split operations arranged in the reverse order of edge collapse operations, i.e.:

$$M_{base} = M_0 \xrightarrow{vsplit_1} M_1 \xrightarrow{vsplit_2} M_2 \ldots \xrightarrow{vsplit_n} M_n = M_{org}$$

This forms a natural progressive representation of the original mesh. The base mesh $M_0$ provides the coarsest approximation while mesh $M_n$ is identical to the original one. Meshes $M_i$, $0<i<n$, incrementally converge to the original one as more vertex split operations are applied.

Figure 9:
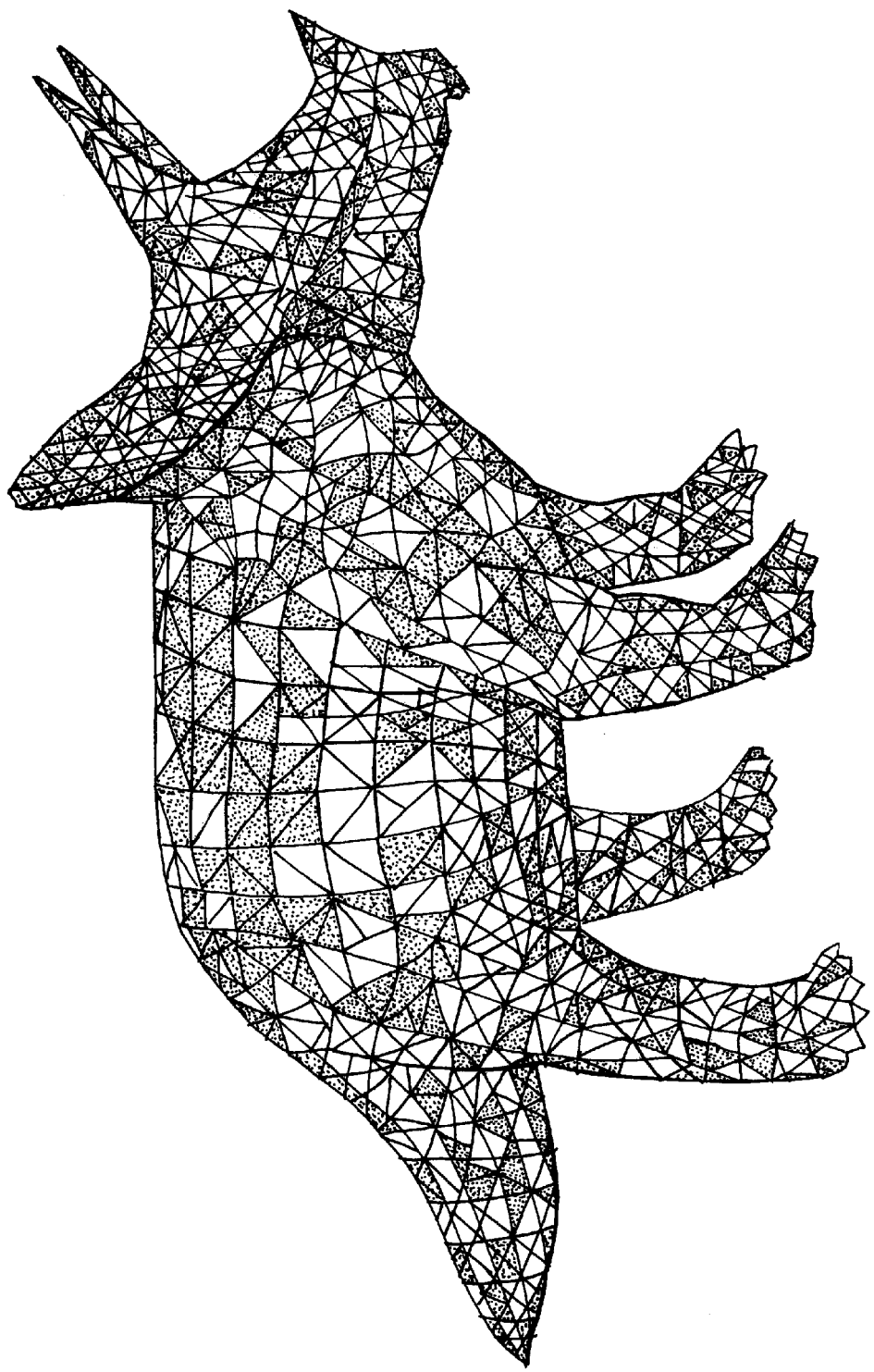
FIG. 9 is a representation of a 3-D model with one layer of independent vertex splits.

Two edge collapse operations $ecol(\{v_{1l}, v_{1u}, v_{1r}, v_{1d}\})$ and $ecol(\{v_{2l}, v_{2u}, v_{2d}\})$ are independent of each other if they do not share any common vertex. In other words, the intersection of sets $\{v_{1l}, v_{1u}, v_{1r}, v_{1d}\}$ and $\{v_{2l}, v_{2u}, v_{2d}\}$ is empty. Two vertex split operations are independent if their corresponding edge collapse operations are independent. Based on this concept, a mesh simplification may be conducted through several consecutive layers where independent edge collapses are performed in the same layer. The independence constraint forces edge collapses spread evenly over the surface of the model. Therefore, the model is simplified across its entire surface in a balanced way. It ensures that the simplified model is of reasonably good quality. FIG. 9 illustrates one layer of independent edge collapses of model Triceratops, where each vertex split is plotted as a patch of two gray triangles. These patches are disjointed with each other. FIG. 9 also shows that two independent vertex splits are commutable. That is, they yield the same final result regardless of the order in which they are applied. For example, every patch in FIG. 9 can be collapsed freely without interfering with the collapses of other patches. A particular order of edge collapse can be chosen to give the best coding performance for intermediate meshes, as detailed below. Each edge collapse results in loss of information and introduces a certain amount of distortion. To optimize the rate-distortion performance, the edge with the least importance is collapsed at each simplification step. This process may be performed as described in Garland et al., "Surface Simplification Using Quadric Error Metrics," Computer Graphics Proceedings, Annual Conference Series, pp. 209–17, ACM SIGGRAPH, August 1997, and Hoppe, "Progressive Meshes," Computer Graphics Proceedings, Annual Conference Series, pp. 99–108, ACM SIGGRAPH, August 1996. The simplification step continues until either a certain quality criterion is met or any further simplification violates the topology of the model. To look from the vertex spilt viewpoint, one should use the vertex split operation to recover the most important vertices first (such as the peak of a spike) and then less important vertices (such as vertices coplanar with their neighboring vertices).

Coding Issues

Base mesh $M_{base}$ and the sequence of vertex split operations $\{vsplit_1, \ldots, vsplit_n\}$ are coded in order to form a single embedded bit stream. The decoder decodes the bit stream and recovers $M_{base}$, $vsplit_1, \ldots, vsplit_n$ sequentially. From this single bit stream, the decoder can reconstruct the model with continuous resolutions, ranging from the coarsest approximation to the finest replica. Depending on application, the decoder can stop at any position of the bit stream to decode a mesh which approximates the original one to a certain degree. For example, a user may want to render a far-away model with a very coarse approximation. In this case, the decoder can stop right after it rebuilds the base mesh. On the other hand, if a user needs a close view of the model, the decoder may decode the entire bit stream. Furthermore, if a user is animating a zooming process by a sequence of frames, the decoder can incrementally decode the bit stream in accordance with the decreasing distance between the camera and the model to get the optimal rendering quality with the minimal computational complexity.

In comparison with original mesh $M_{org}$ base mesh $M_{base}$ is very simple. For example, a high quality mesh of the sphere may have tens of thousands of vertices and triangles. However, its base mesh is the simplest 3-D mesh, i.e. a tetrahedron. The base mesh can be coded as a regular mesh with the single-resolution mode. Only a few bits are required to encode the base mesh.

The vertex split operations are applied in a layered fashion. The first layer starts from the base mesh, and every following-layer starts from the mesh resulting from the previous layer. At the beginning of each layer i, all vertices are ordered as a 1D list $L_i$ and every vertex in the list can be split into two new vertices. List $L_i$ is modified when a vertex split occurs. One binary flag splitFlag is allocated for each vertex. If vertex v indeed splits, splitFlag(v) takes the value of TRUE. Otherwise, it takes the value of FALSE. The coding of layer i starts from the first vertex of list $L_i$. One vertex is processed at a time. Let $v_c$ denote the vertex under current processing. If $v_c$ does not split, splitFlag ($v_c$) is set to FALSE and coded, the encoder goes to the next vertex in $L_i$. If $v_c$ is indeed split by vsplit($\{v_l, v_c, v_r\}$), splitFlag ($v_c$) is set to TRUE and coded. Furthermore, the vertex id of $v_l$ and $v_r$ can be coded jointly. Suppose $v_c$ is of valence n before splitting, and $v_l$ and $v_r$ are two of its n neighboring vertices. There are n(n−1)/2 different patterns to choose two out of the n neighbors. It is possible to code $v_l$ and $v_r$ jointly from a careful analysis of these patterns.

After $v_c$ splits into two vertices $v_u$ and $v_d$, $v_u$ replaces $v_c$ in $L_i$ while $v_d$ is added to the end of $L_i$. Then the encoder visits the next vertex in $L_i$. This process is repeated until all vertices initially listed in $L_i$ are coded. New vertices created during the coding of layer i and appended to $L_i$ are not visited at the same layer. At the end of coding of the layer i, $L_i$ becomes $L_{i+1}$ and then the coding of layer i+1 starts.

The position of new vertex $v_c$ for an edge collapse can be determined and recorded in two ways. The simplest way is to place $v_c$ in the middle of the collapsed edge ($v_u, v_d$). A more sophisticated way is to place $v_c$ in such a position that the distortion due to the edge collapse is minimized. For this case, the new position is generally not the middle point of edge ($v_u, v_d$). The second approach provides a graphic model of better quality at the expense of a higher computational complexity. Furthermore, since the distortion incurred at any stage will inevitably propagate to the latter stage the quality of the mesh deteriorates at a greater rate by using the first approach. However, from the coding viewpoint, the first approach requires fewer bits. Two displacements $v_u-v_c$ and $v_c-v_d$ must be encoded to perform the vertex split operation with the second approach while only one displacement is needed with the first approach due to the fact that $v_u-v_c=v_c-v_d$. Since the coding of displacements takes the lion share of bit consumption, the first approach reduces the bit requirement significantly. Under the same bit budget, it can encode many more vertex split operations than the second approach. The tradeoff is that under the same bit budget the first approach encodes more vertex splits while each vertex split operation contributes less to improve the quality. It is observed that the first approach gives a better overall performance. Additional, the first approach is computationally simpler. Under the first approach, for each vertex split vsplit ($v_l, v_c, v_r$), the displacement of position $v_u-v_c=v_c-v_d$ must be coded in order for the decoder to rebuild the model. First, all vertex displacements are collected into a sequence in the order of occurrence of vertex splits. Then, the sequence is coded by successive quantization and embedded coding techniques as described in Li et al., "Progressive Coding of 3D Graphic Models," Proceedings of IEEE, Vol. 86, pp. 1052–63, June 1998, the disclosure of which is hereby incorporated by reference in its entirety.

Integration

Two coding procedures were presented before, i.e., the coding of connectivity and geometry data. Each coding scheme produces its own bit stream. These two bit streams have to be multiplexed into a single bit stream. The quality of the reconstructed model depends on both the number of vertices and the precision of vertex position. The more a bit stream is decoded, the more similar the decoded model is to the original model. Decoding of either bit stream contributes to the reduction of compression distortion. The contribution of bits decreases according to their order in each bit stream. It is desirable that this property is preserved in the final bit stream as well. This problem is similar to the merger of two arrays, each of which has been sorted according to a certain measurement individually into one array. In this case, the measurement is "distortion reduction per bit." A rate-distortion model is built for each bit stream to study the average distortion reduction per bit so that these two bit streams can be multiplexed in a proper order. For more details on this process, the reader is directed to the aforementioned article by Li et al., entitled, "Progressive Coding of 3D Graphic Models."

Experimental Results

Figure 10:
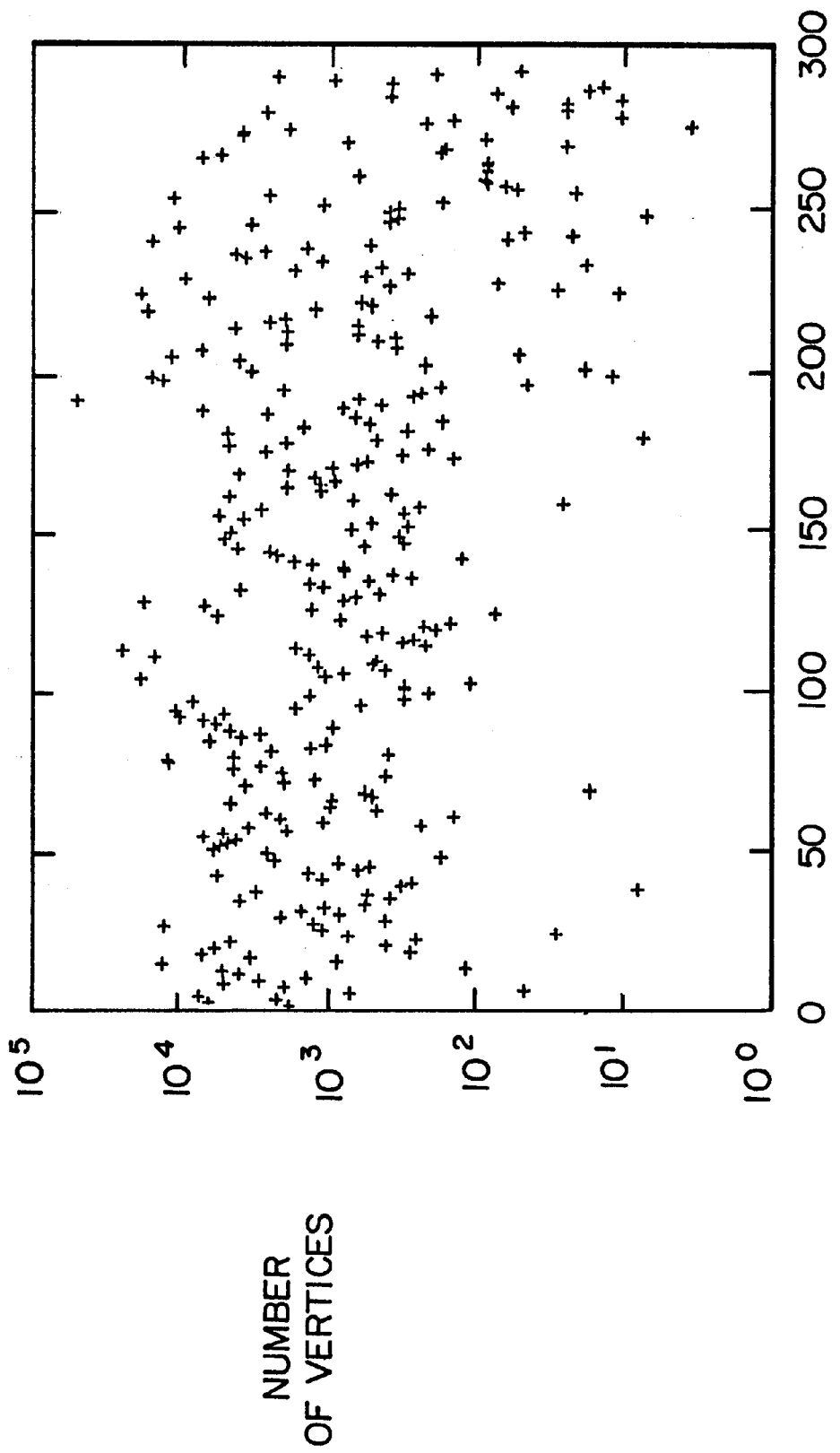
FIG. 10 is a graph illustrating the size distribution of 300 test models.

A test data set consisting of 300 models was used to validate the coding approach disclosed herein. The size of these 300 meshes is well distributed. FIG. 10 illustrates the size of each mesh in terms of the number of vertices. Note that the x-axis is plotted in the log scale. The smallest size is four, which corresponds to a tetrahedron while the largest size is 54898 which corresponds to a complicated gear set.

Figure 11:
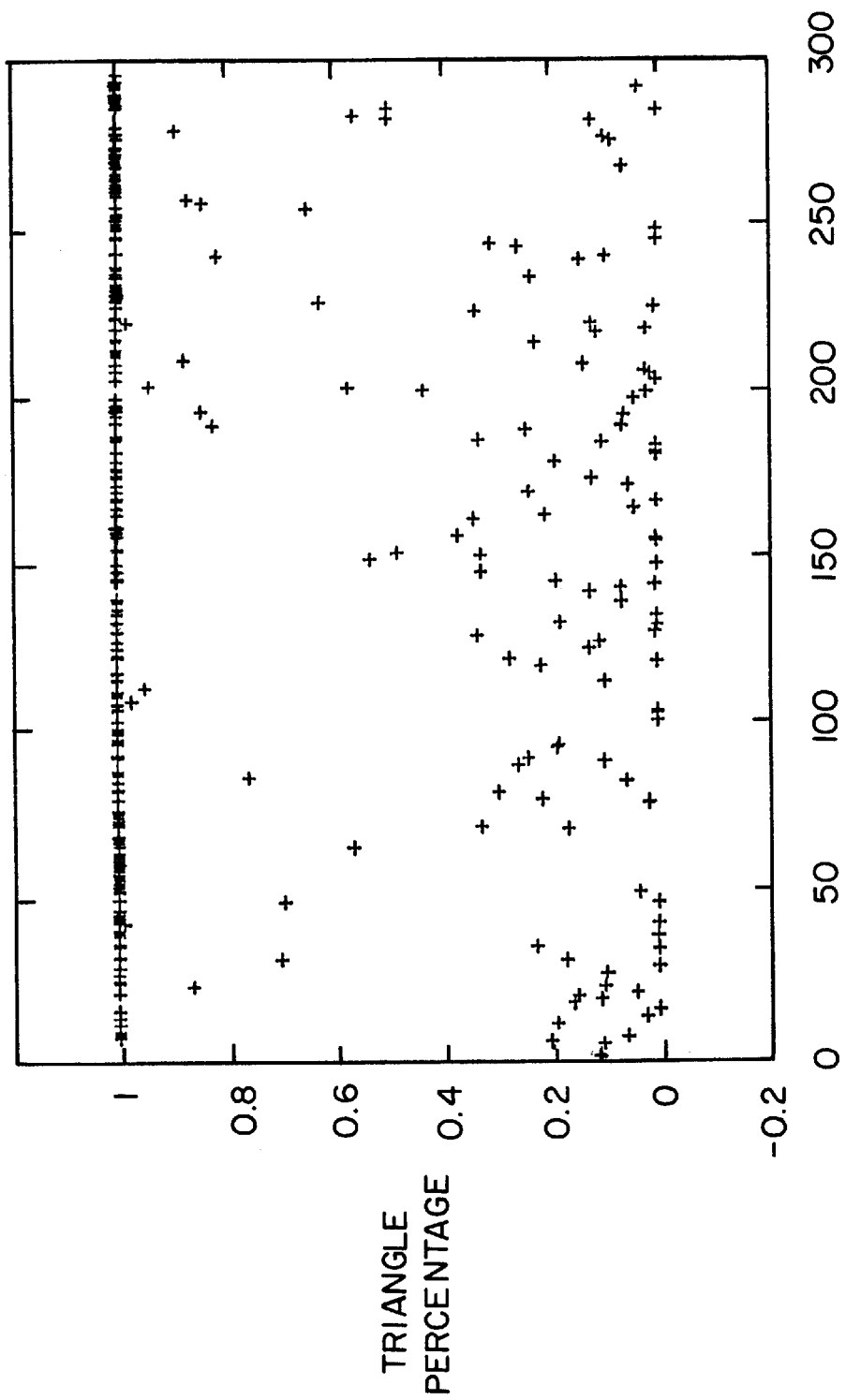
FIG. 11 is a graph illustrating the ratio of triangular meshes for 300 test models.

As mentioned before, most meshes consist primarily of triangles and rectangles. The ratio of the number of triangles to the total number of polygons for each mesh is plotted in FIG. 11. As can be seen from FIG. 11, the triangle is the most common form of polygon, the rectangle is a distant second and polygons of higher degree are relatively few. This can be explained by the fact that a plane in the 3-D Euclidean space is determined by three points which form a triangle. To represent a 3-D graphic model by a polyhedral mesh, the surface of the model is actually approximated by piecewise plane segments which can be conveniently and faithfully constructed by triangles. In the smooth parts of a surface, rectangle patches are also commonly used.

Figure 12:
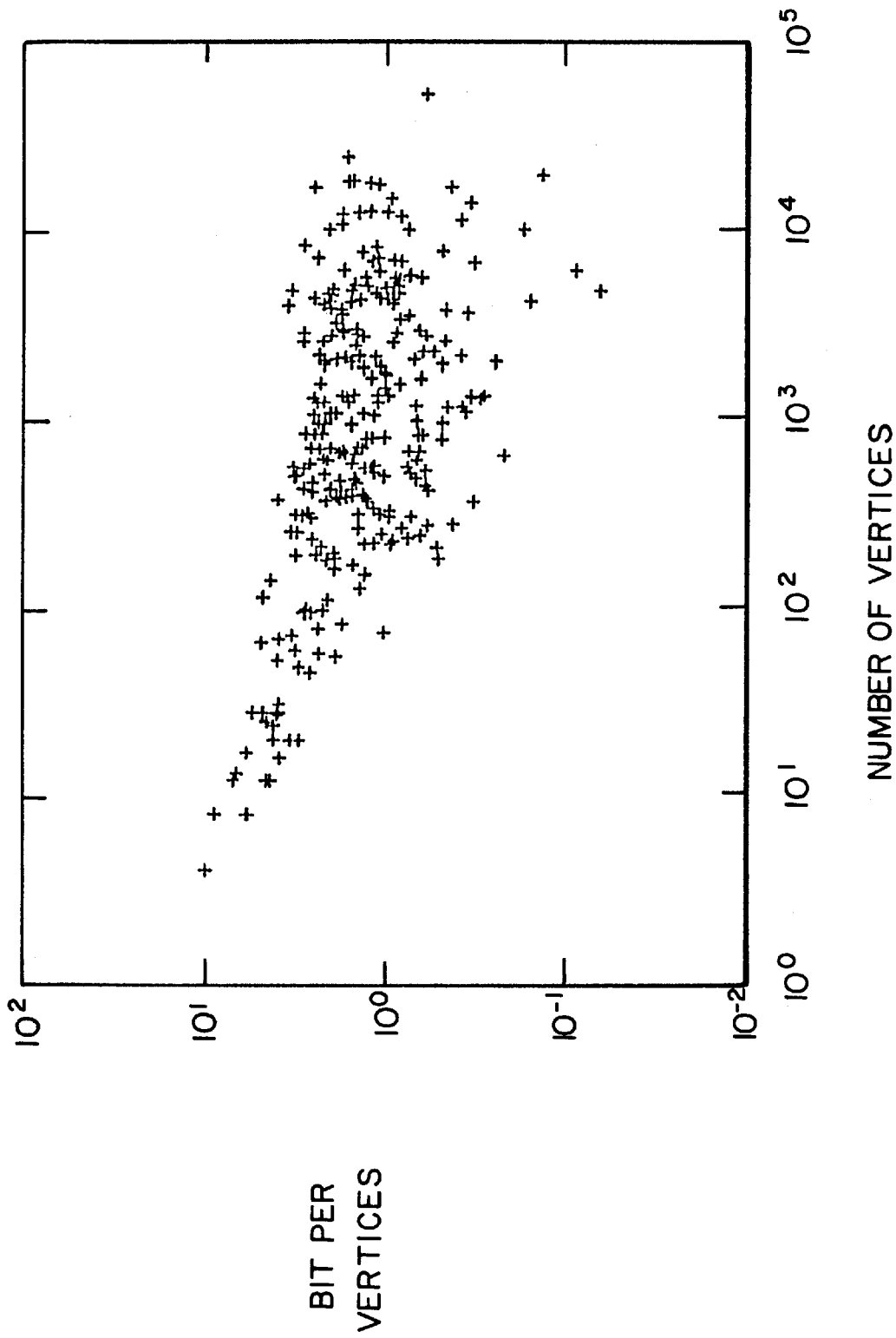
FIG. 12 is a graph illustrating the coding performance versus the number of vertices.

The proposed topological (or connectivity) coding scheme described herein was tested on the entire model set. The compression performance versus the size of the model in terms of the number of vertices is shown in FIG. 12. From this figure it can be appreciated that, generally speaking, the compression performance is better as the size of the model is larger. However, since models can have a wide variety of topological structures, the model size is not the only factor controlling the compression performance. Statistics about the performance of connectivity coding are summarized in Table 1 as follows:

|  | mean | max | min | dev |
|---|---|---|---|---|
| BitsPerVertex | 2.18 | 11.0 | 0.082 | 1.54 |
| BitsPerPolygon | 2.02 | 12.5 | 0.088 | 1.91 |
| BitsPerTriangle | 1.46 | 11.0 | 0.044 | 1.16 |

As can be seen, 2.18 bits per vertex on average can be achieved. If coding bits are normalized with respect to the number of polygon of a mesh there are 2.02 bits per polygon. For triangular meshes, the average bits per triangle can also be computed and is equal to 1.46 bits per triangle.

Figure 13A:
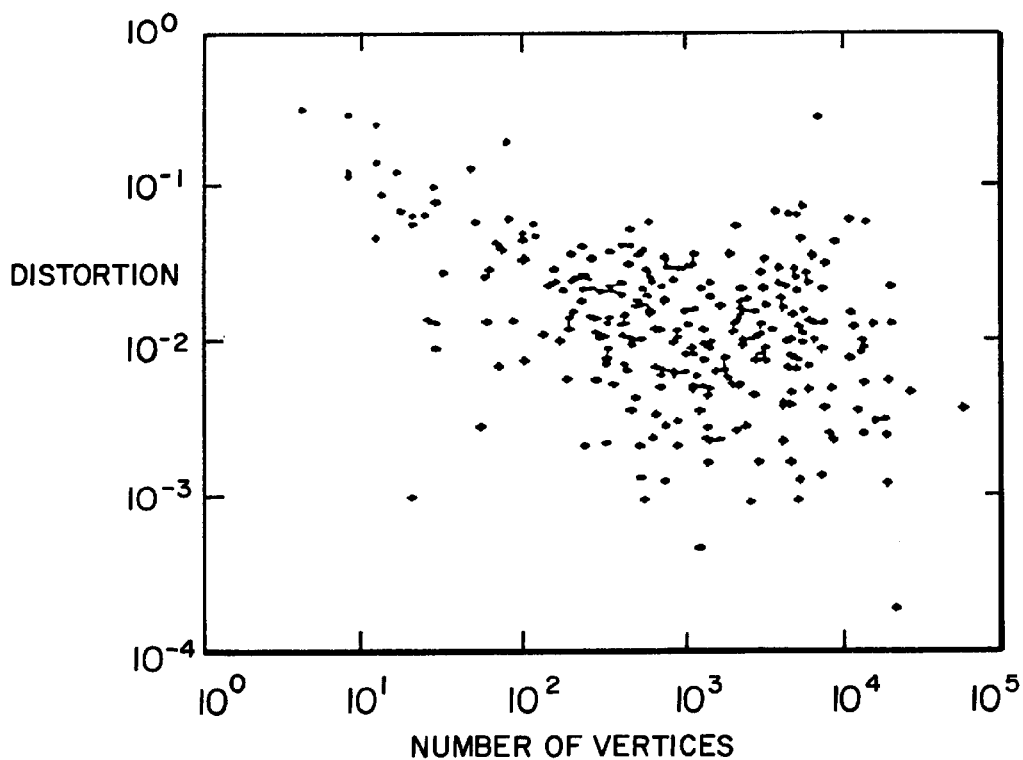
FIG. 13(a) is a graph illustrating the performance of geometrical data coding with 10 bits/vertex.
Figure 13B:
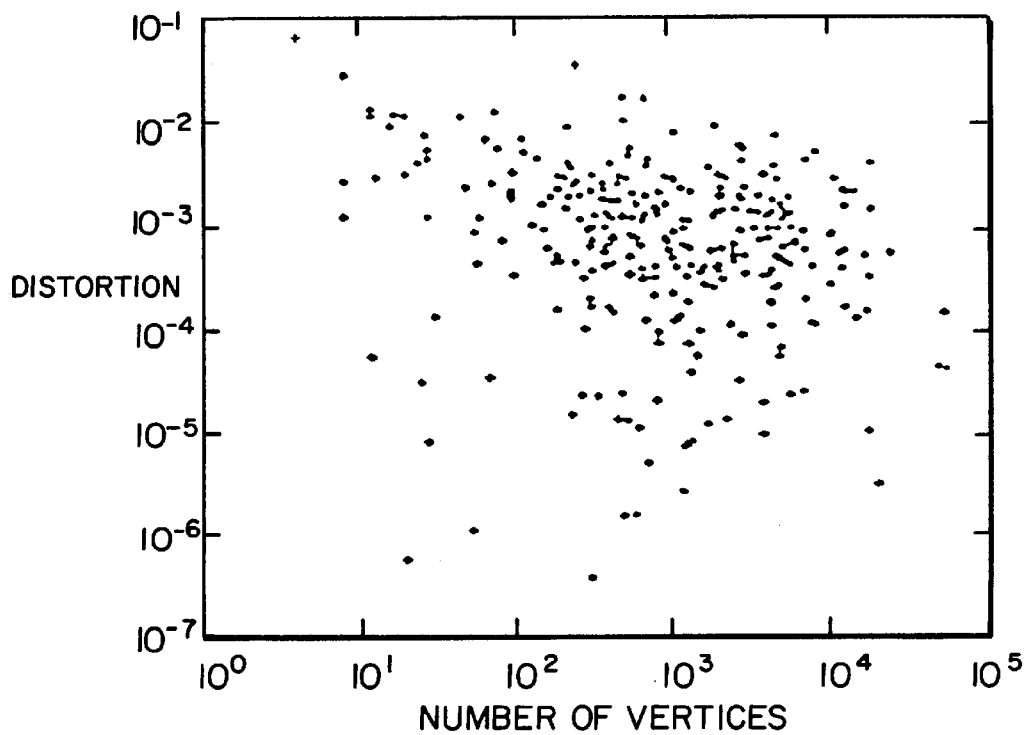
FIG. 13(b) is a graph illustrating the performance of geometrical data coding with 20 bits/vertex.
Figure 13C:
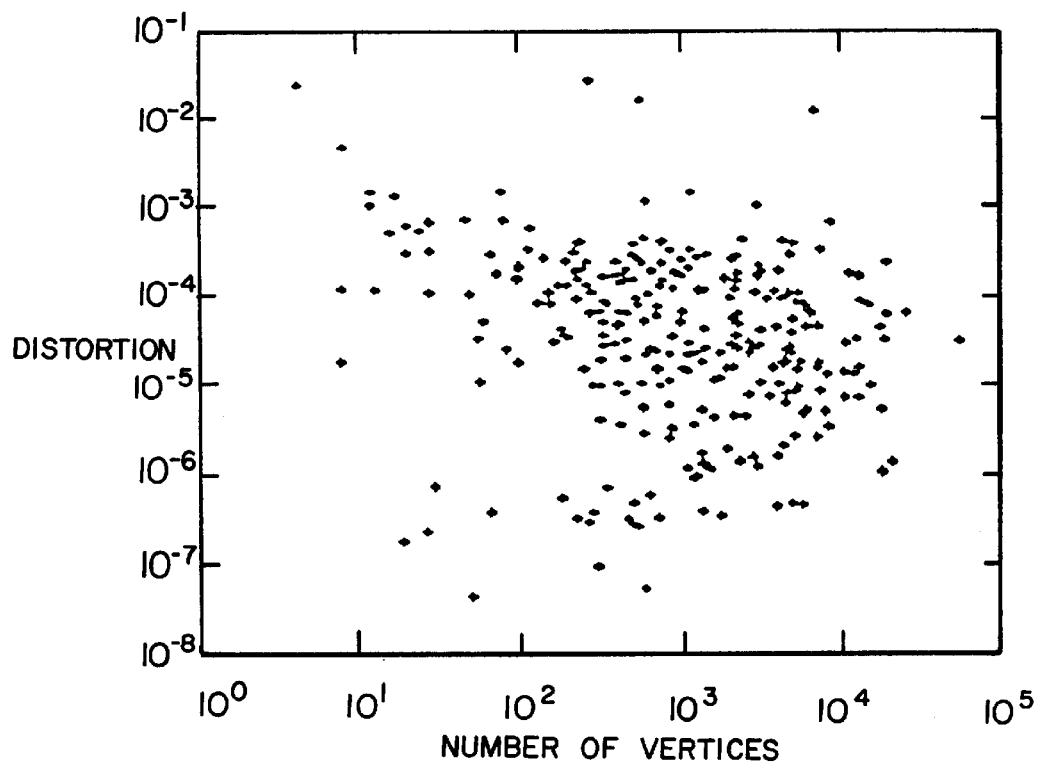
FIG. 13(c) is a graph illustrating the performance of geometrical data coding with 30 bits/vertex.
Figure 13D:
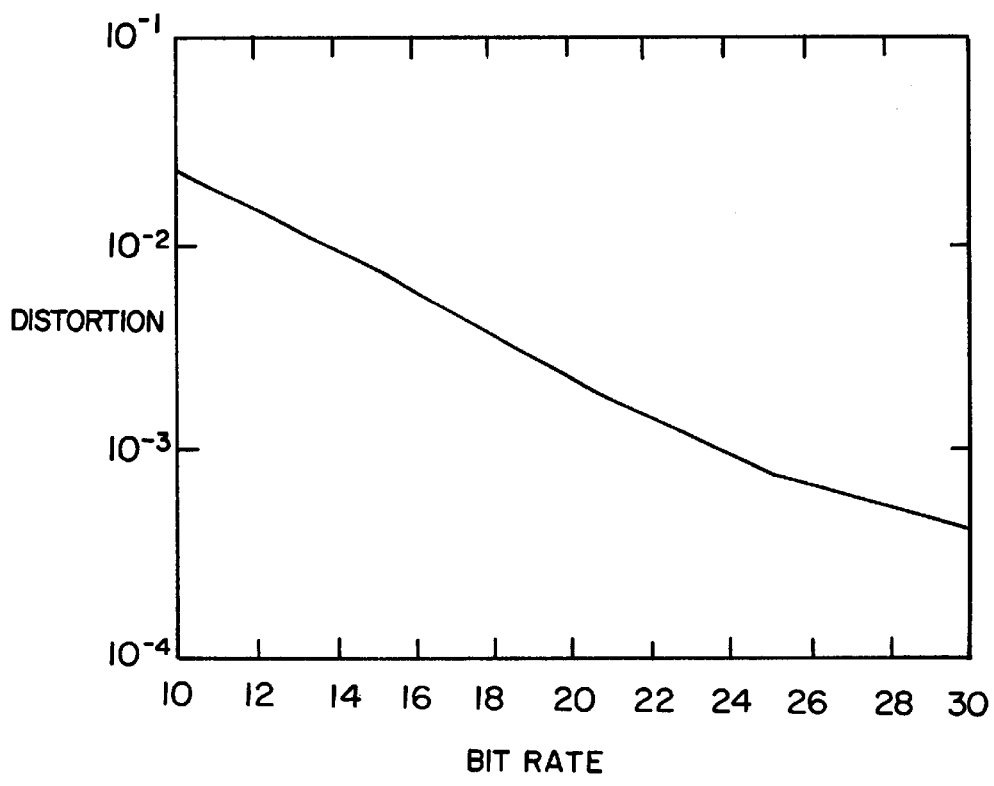
FIG. 13(d) is a graph illustrating the performance of geometrical data coding with the rate-distortion tradeoff plot.
Figure 14B:
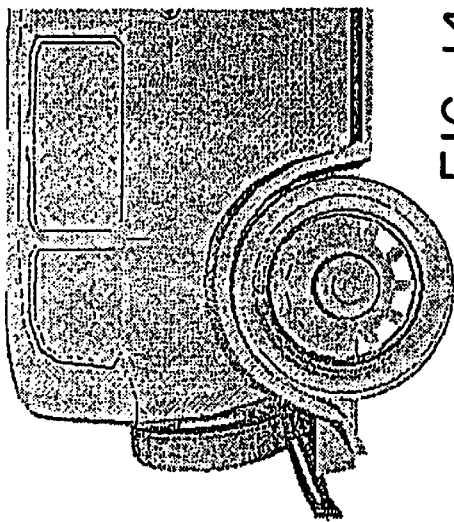
FIG. 14(b) is a representation of a model "dodge" illustrating compression at 15 bits/vertex.
Figure 14D:
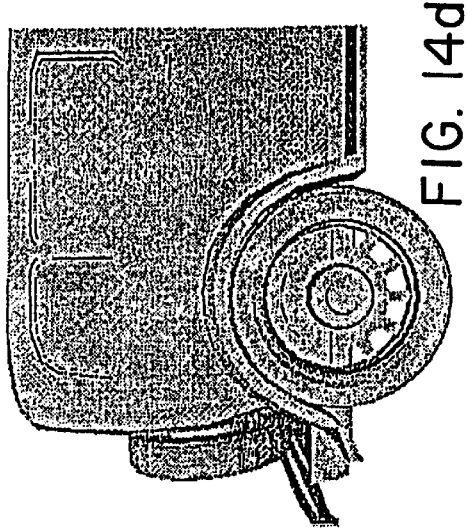
FIG. 14(d) is a representation of the model "dodge" illustrating compression at 25 bits/vertex.
Figure 14A:
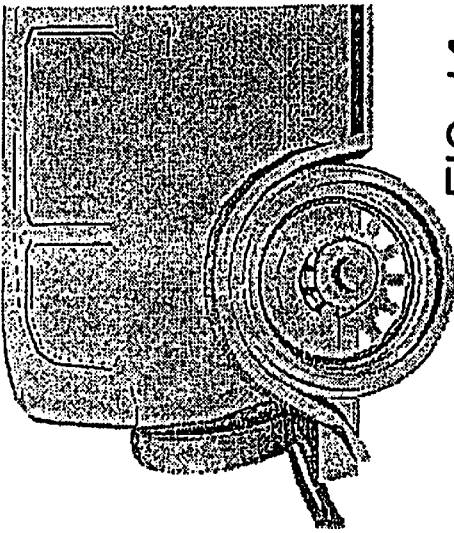
FIG. 14(a) is a representation of a model "dodge" illustrating compression at 10 bits/vertex.
Figure 14C:
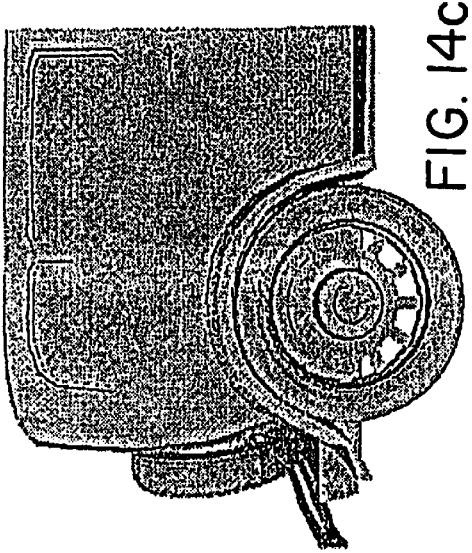
FIG. 14(c) is a representation of the model "dodge" illustrating compression at 20 bits/vertex.

The proposed geometry coding scheme herein described was tested on the entire test data set. Since the algorithm has an embedded property the decoder can rebuild the model at any bit rates. FIGS. 13 (a) (b) and (c) show the compression performance at bit rates of 10, 20, and 30 bits per vertex respectively. FIG. 13(d) illustrates the tradeoff of bit rate to distortion. Some statistics based on the entire model set are summarized in Table 2:

| BitPerVertex | Mean | Max | Min | Dev |
|---|---|---|---|---|
| 10 | 0.0232 | 0.2893 | 1.86e-4 | 0.0363 |
| 15 | 0.0077 | 0.3497 | 2.20e-6 | 0.0224 |
| 20 | 0.0022 | 0.0610 | 3.57e-7 | 0.0052 |
| 25 | 0.0008 | 0.0305 | 1.43e-8 | 0.0029 |
| 30 | 0.0004 | 0.0271 | 0 | 0.0024 |

FIGS. 14(a), 14(b), 14(c) and 14(d) illustrate the result of constructing the model "dodge" using the different bit rates 10 bits/vertex, 15 bits/vertex, 20 bits/vertex, and 25 bits/vertex, respectively.

One noticeable artifact associated with high compression ratios is the "crack" effect, which refers to gaps between different components of a model that are supposed to be stitched together. The reason for the crack phenomenon is that two vertices from different components may have the same position in the original model but they are predicted by different ancestors and, therefore, have different residues and get different quantization error. When decompressed, this difference causes the two vertices to take different positions. However, the crack does disappear when the compression ratio is in the medium and low ranges where a finer quantization step size is adopted.

Having thus described an embodiment of the invention, it be understood by those skilled in the art that many changes in construction and widely differing embodiments and applications of the invention will suggest themselves without departing from the spirit and scope of the invention. Thus, the disclosure and the description herein are purely illustrative and are not intended to be in any sense limiting.

What is claimed is:

1. A method of encoding a three dimensional model represented by polyhedral meshes to provide a compressed data representation of the three dimensional model, said method comprising the steps of:

A. treating the mesh structure according to the following sequence:

1. select a starting node $n_s$ and a principle link I associated with the starting node $n_s$;

2. traverse each link associated with the starting node in a counter clockwise direction starting with the principle link;

3. for each link traversed in Step 2, add the traversed link ending node $n_e$ to a queue and set the link as the principle link, if the ending node is not already in the queue;

4. after each link associated with the starting node $n_s$ has been traversed go to the next node in the queue and repeat Steps 3 and 4 until all nodes in the queue have been traversed, and then terminate;

B. recording each link associated with each node of the mesh traversed.

2. The method of claim 1 further comprising the step of identifying the ending node $n_e$ of Step A-3 as a branch node if not in the queue and a merger node if in the queue.

3. The method of claim 2 further comprising the step of identifying each merger node according to a global indexing scheme.

4. The method of claim 2 further comprising the step of identifying each merger node according to a local indexing scheme.

5. The method of claim 4 wherein the local indexing scheme comprises a clockwise tracing or a counter clockwise tracing to the merger node from the starting node $n_s$, whichever is shorter.

6. The method of claim 1 further comprising the step of specifying the attributes of the node for each node traversed in step A.

7. The method of claim 6 wherein each of the attributes of the node are selected from the group consisting of position, normal, color and texture.

8. The method of claim 6 further comprising the step of coding the attributes of the node, comprising the steps of:

1. ordering the attributes to be coded;

2. producing a sequence of prediction residues for each coded attribute; and 3. quantizing and coding the prediction residues.

9. A method of encoding a three dimensional model represented by polyhedral meshes to provide a compressed data representation of the three dimensional model, said method comprising the steps:

coding the structure data of the polyhedral meshes representing the three dimensional model, wherein the step of coding the structure data comprises the steps of selecting a starting node $n_s$ and a principle link associated with the starting node $n_s$, and traversing a selected link associated with the starting node $n_s$ in a counter clockwise direction starting with the principle link;

coding the attribute data of the polyhedral meshes representing the three dimensional model; and multiplexing the encoded structure data and the encoded attribute data into a single data stream.

10. The method of claim 9 wherein the step of coding the structure data comprises the step of:

adding the selected link ending node $n_e$ to a queue and setting the link as the principle link if the ending node $n_e$ is not already in the queue.

11. The method of claim 10 further comprising the step of traversing all nodes in the queue by repeating said traversing step and said adding step.

12. The method of claim 10 further comprising the step of identifying the ending node $n_e$ as a branch node if the ending node $n_e$ is not in the queue and as a merger node if the identifying node $n_e$ is in the queue.

13. The method of claim 12 further comprising the step of identifying each merger node according to a global indexing scheme.

14. The method of claim 12 further comprising the step of identifying each merger node according to a local indexing scheme.

15. The method of claim 14 wherein the local indexing scheme comprises a clockwise tracing to the merger node from the starting node $n_s$.

16. The method of claim 14 wherein the local indexing scheme comprises a counter clockwise tracing to the merger node from the starting node $n_s$.

17. The method of claim 9 wherein the step of coding the attribute data comprises the step of specifying the attributes of each node in the polyhedral meshes.

18. The method of claim 17 wherein each of the attributes of each node in the polyhedral meshes are selected from the group consisting of position, normal, color and texture.

19. The method of claim 17 further comprising the step of coding the attributes of each node, comprising the steps of:
 ordering the attributes to be coded;
 producing a sequence of prediction residues for each coded attribute; and
 quantizing and coding the prediction residues.

20. A method of encoding a tree dimensional model represented by polyhedral meshes to provide a compressed data representation of the three dimensional model, said method comprising the steps of:
 A. treating the mesh structure according to the following sequence:
  1. select a starting node $n_s$ and a principle link I associated with the starting node $n_s$;
  2. traverse each link associated with the starting node in a clockwise direction starting with the principle link;
  3. for each link traversed in Step 2, add the traversed link ending node $n_s$ to a queue and set the link as the principle link, if the ending node is not already in the queue;
  4. after each link associated with the starting node $n_s$ has been traversed go to the next node in the queue and repeat Steps 3 and 4 until all nodes in the queue have been traversed, and then terminate;
 B. recording each link associated with each node of the mesh traversed.

21. The method of claim 20 further comprising the step of identifying the ending node $n_e$ of Step A-3 as a branch node if not in the queue and a merger node if in the queue.

22. The method of claim 21 further comprising the step of identifying each merger node according to a global indexing scheme.

23. The method of claim 21 further comprising the step of identifying each merger node according to a local indexing scheme.

24. The method of claim 23 wherein the local indexing scheme comprises a counter clockwise tracing or a clockwise tracing to the merger node from the starting node $n_s$, whichever is shorter.

25. The method of claim 20 further comprising the step of specifying the attributes of the node for each node traversed in step A.

26. The method of claim 25 wherein each of the attributes of the node are selected from the group consisting of position, normal, color and texture.

27. The method of claim 25 further comprising the step of coding the attributes of the node, comprising the steps of:
 1. ordering the attributes to be coded;
 2. producing a sequence of prediction residues for each coded attribute; and
 3. quantizing and coding the prediction residues.

28. A method of encoding a three dimensional model represented by polyhedral meshes to provide a compressed data representation of the three dimensional model, said method comprising the steps:
 coding the structure data of the polyhedral meshes representing the three dimensional model, wherein the step of coding the structure data comprises the steps of selecting a starting node $n_s$ and a principle link associated with the starting node $n_s$, and traversing a selected link associated with the starting node $n_s$ in a clockwise direction starting with the principle link;
 coding the attribute data of the polyhedral meshes representing the three dimensional model; and
 multiplexing the encoded structure data and the encoded attribute data into a single data stream.

29. The method of claim 28 wherein the step of coding the structure data comprises the step of:
 adding the selected link ending node $n_e$ to a queue and setting the link as the principle link if the ending node $n_s$ is not already in the queue.

30. The method of claim 29 further comprising the step of traversing all nodes in the queue by repeating said traversing step and said adding step.

31. The method of claim 29 further comprising the step of identifying the ending node $n_s$ as a branch node if the ending node $n_s$ is not in the queue and as a merger node if the identifying node $n_s$ is in the queue.

32. The method of claim 31 further comprising the step of identifying each merger node according to a global indexing scheme.

33. The method of claim 31 further comprising the step of identifying each merger node according to a local indexing scheme.

34. The method of claim 33 wherein the local indexing scheme comprises a counter clockwise tracing to the merger node from the starting node $n_s$.

35. The method of claim 33 wherein the local indexing scheme comprises a clockwise tracing to the merger node from the starting node $n_s$.

36. The method of claim 28 wherein the step of coding the attribute data comprises the step of specifying the attributes of each node in the polyhedral meshes.

37. The method of claim 36 wherein each of the attributes of each node in the polyhedral meshes are selected from the group consisting of position, normal, color and texture.

38. The method of claim 36 further comprising the step of coding the attributes of each node, comprising the steps of:
 ordering the attributes to be coded;
 producing a sequence of prediction residues for each coded attribute; and
 quantizing and coding the prediction residues.

* * * * *